US012744021B2

(12) United States Patent
Jeong et al.

(10) Patent No.: US 12,744,021 B2
(45) Date of Patent: Sep. 22, 2026

(54) VIBRATION APPARATUS

(71) Applicant: LG Display Co., Ltd., Seoul (KR)

(72) Inventors: Uihyeon Jeong, Paju-si (KR); Chiwan Kim, Paju-si (KR); SeungRyull Park, Paju-si (KR); Yong-Su Ham, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1015 days.

(21) Appl. No.: 17/965,427

(22) Filed: Oct. 13, 2022

(65) Prior Publication Data

US 2023/0215410 A1 Jul. 6, 2023

(30) Foreign Application Priority Data

Dec. 31, 2021 (KR) ........................ 10-2021-0194793

(51) Int. Cl.

*G10K 9/12* (2006.01)
*G10K 9/122* (2006.01)
*G10K 9/22* (2006.01)
*H04R 17/00* (2006.01)

(52) U.S. Cl.

CPC ............... *G10K 9/122* (2013.01); *G10K 9/22* (2013.01); *H04R 17/00* (2013.01); *H04R 2499/15* (2013.01)

(58) Field of Classification Search

CPC .. H10N 30/20; H10N 30/204; H10N 30/2045; G10K 9/122; H04R 17/00
USPC .................................................. 310/324, 328
See application file for complete search history.

(56) References Cited

U.S. PATENT DOCUMENTS

| | | | | |
|---|---|---|---|---|
| 2005/0168111 | A1* | 8/2005 | Bank | H04R 7/045 310/348 |
| 2007/0013270 | A1 | 1/2007 | Sashida et al. | |
| 2007/0096594 | A1* | 5/2007 | Maruyama | H10N 30/101 310/317 |
| 2018/0035200 | A1 | 2/2018 | Abe et al. | |
| 2018/0081438 | A1* | 3/2018 | Lehmann | G06F 3/03543 |
| 2020/0059735 | A1 | 2/2020 | Kim | |
| 2020/0314556 | A1 | 10/2020 | Lee et al. | |
| 2021/0304920 | A1 | 9/2021 | Ko et al. | |
| 2021/0306741 | A1 | 9/2021 | Kim et al. | |
| 2021/0392439 | A1 | 12/2021 | Ye | |

FOREIGN PATENT DOCUMENTS

| | | | |
|---|---|---|---|
| CN | 107852554 | A | 3/2018 |
| CN | 113467634 | A | 10/2021 |

(Continued)

OTHER PUBLICATIONS

Office Action dated Dec. 27, 2023 for Japanese Patent Application No. 2022-173695.

(Continued)

*Primary Examiner* — Derek J Rosenau
(74) *Attorney, Agent, or Firm* — Morgan, Lewis & Bockius LLP

(57) ABSTRACT

An apparatus may enhance a sound characteristic and/or a sound pressure level characteristic. An apparatus includes a vibration member, a vibration apparatus under the vibration member, a plurality of vibration portions overlapping one another, and a connection member connecting at least a portion of the plurality of vibration portions to the vibration member.

32 Claims, 18 Drawing Sheets

(56) References Cited

FOREIGN PATENT DOCUMENTS

| | | | |
|---|---|---|---|
| CN | 113471356 | A | 10/2021 |
| JP | 2020-167655 | A | 10/2020 |

OTHER PUBLICATIONS

Office Action issued in corresponding Chinese Patent Application No. 202211261373.5, dated Jul. 17, 2025. (Note: US 2021/0392439 A1 and US 2007/0013270 A1 were previously cited.).

Extended European search report issued in corresponding EP Patent Application No. 22200581.1 dated May 22, 2023.

* cited by examiner

VIBRATION APPARATUS

CROSS-REFERENCE TO RELATED APPLICATIONS

This application claims the benefit of the Korean Patent Application No. 10-2021-0194793 filed on Dec. 31, 2021, which is hereby incorporated by reference as if fully set forth herein.

BACKGROUND

Technical Field

The present disclosure relates to an apparatus.

Discussion of the Related Art

Vibration apparatuses may vibrate based on a type such as a coil type including a magnet and a coil or a piezoelectric type using a piezoelectric device to output a sound.

Piezoelectric-type vibration apparatuses may be easily damaged by an external impact due to a fragile characteristic of a piezoelectric device, causing a problem where the reliability of sound reproduction is low. Also, because a piezoelectric constant of a piezoelectric device is low, the piezoelectric-type vibration apparatuses have a drawback where a sound characteristic and/or a sound pressure level characteristic are/is lower than the coil type in a low-pitched sound band region.

SUMMARY

Therefore, the inventors have recognized problems described above and performed various experiments for implementing a vibration apparatus capable of enhancing the quality of a sound and a sound pressure level characteristic. Through various experiments, the inventors have invented an apparatus including a new vibration apparatus for enhancing the quality of a sound and a sound pressure level characteristic.

Accordingly, embodiments of the present disclosure are directed to an apparatus that substantially obviates one or more of the problems due to limitations and disadvantages of the related art.

An aspect of the present disclosure is to provide an apparatus that may vibrate a vibration member to generate a vibration or a sound and may enhance a sound characteristic and/or a sound pressure level characteristic.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these other aspects of the inventive concepts, as embodied and broadly described herein, an apparatus comprises a vibration member, a plurality of vibration generating portions overlapping one another, and a connection member connecting at least a portion of the plurality of vibration generating portions to the vibration member.

In another aspect, an apparatus comprises a vibration member, a plurality of vibration portions overlapping one another, each of which includes a vibration layer, and a connection member connecting at least a portion of the vibration portions to the vibration member, each of the vibration layers include a plurality of first portions and a plurality of second portions including material different from the plurality of first portions.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects and embodiments of the disclosure and together with the description serve to explain principles of the disclosure.

Figure 1:
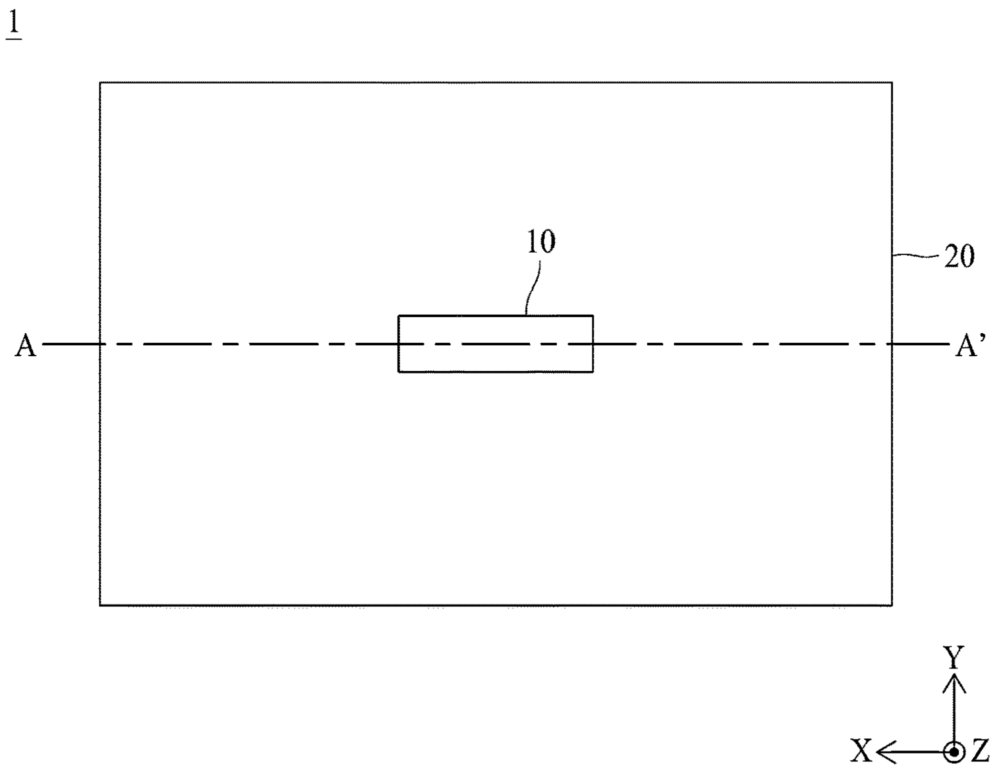
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals refer to like elements throughout unless stated otherwise. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and completely convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, embodiments of the present disclosure are not limited to the illustrated details. Like reference numerals refer to like elements throughout the specification. In the following description, when the detailed description of the relevant known function or configuration is determined to unnecessarily obscure the important point of the present disclosure, the detailed description will be omitted.

When the terms "comprise," "have," and "include," "contain," "constitute," "make up of," "formed of," and the like are used, one or more other elements may be added unless the term, such as "only" is used. The terms of a singular form may include plural forms unless the context clearly indicates otherwise.

In construing an element, the element is construed as including an error range even where no explicit description of such an error or tolerance range is provided.

In describing a position relationship, for example, when the position relationship is described using "on," "over," "under," "above," "below," "beneath," "near," "close to," or "adjacent to," "beside," "next to," or the like, one or more parts may be disposed between the two parts unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "front," "rear," "left," "right," "top," "bottom, "downward," "upward," "upper," "lower," and the like refer to an arbitrary frame of reference.

In describing a time relationship, for example, when the temporal order is described as "after," "subsequent," "next," and "before," "prior to," or the like, a case that is not continuous may be included unless a more limiting term, such as "just," "immediate(ly)," or "direct(ly)" is used.

It will be understood that, the terms "first," "second," "A," "B," "(a)," "(b)," or the like may be used. These terms are intended to identify the corresponding elements from the other elements, and basis, order, or number of the corresponding elements should not be limited by these terms. The expression that an element is "connected," "coupled," or "adhered" to another element or layer means that the element or layer can not only be directly connected or adhered to another element or layer, but also be indirectly connected or adhered to another element or layer with one or more intervening elements or layers disposed or interposed between the elements or layers, unless otherwise specified.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a preferred embodiment of an apparatus according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

Figure 2:
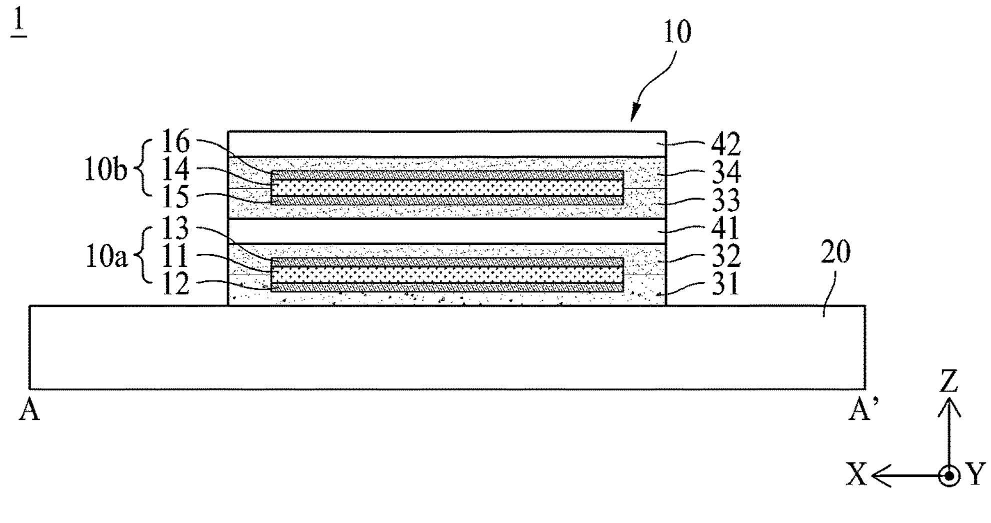
FIG. 2 is a cross-sectional view taken along line A-A' illustrated in FIG. 1.
Figure 3A:
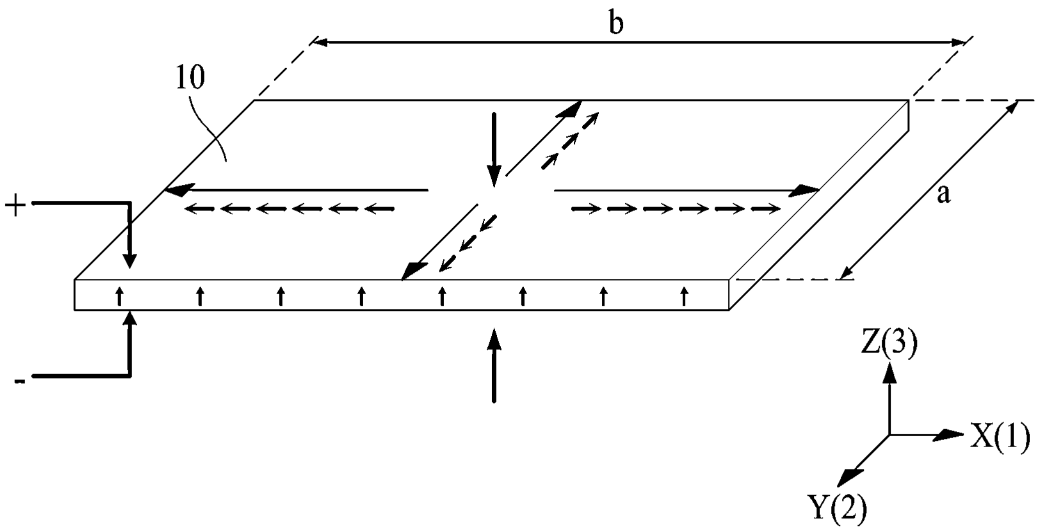
FIGS. 3A to 3D illustrate a displacement of a vibration apparatus according to an embodiment of the present disclosure.
Figure 3B:
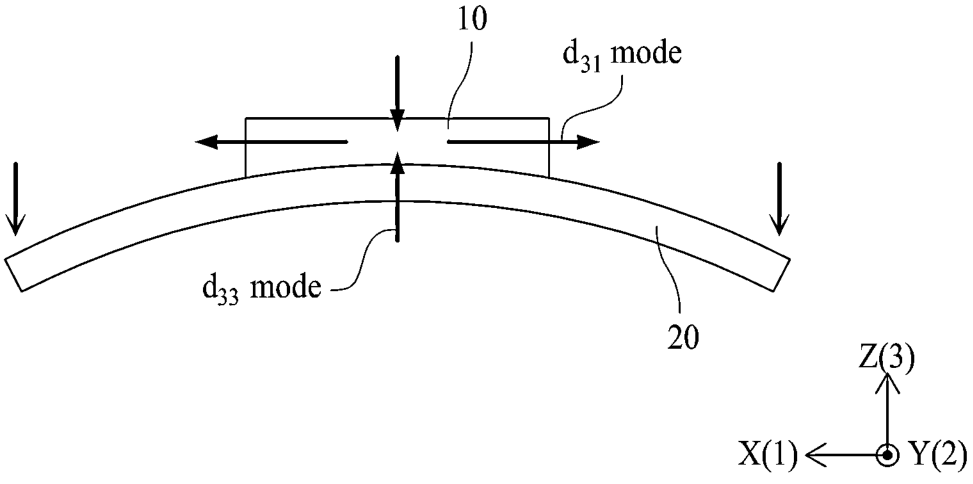
Figure 3C:
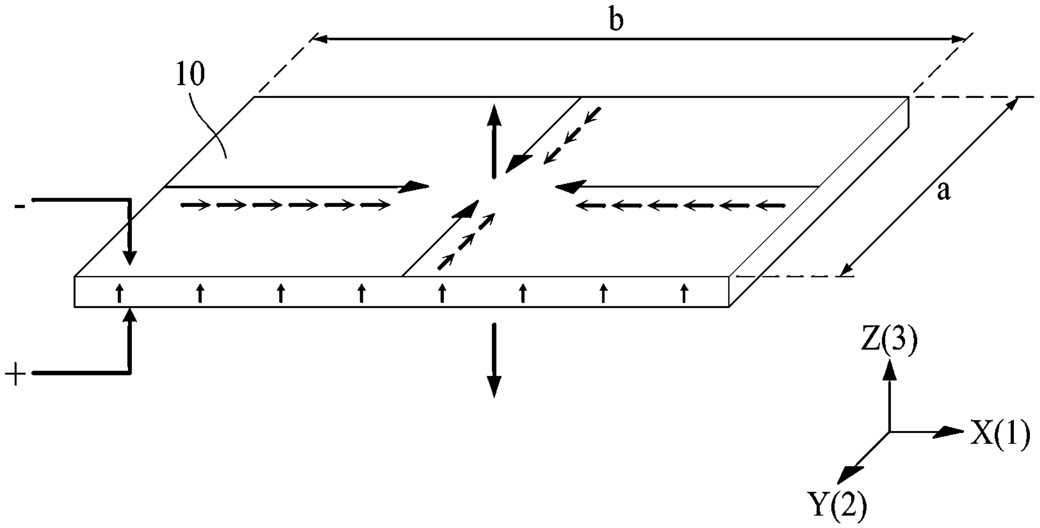
Figure 3D:
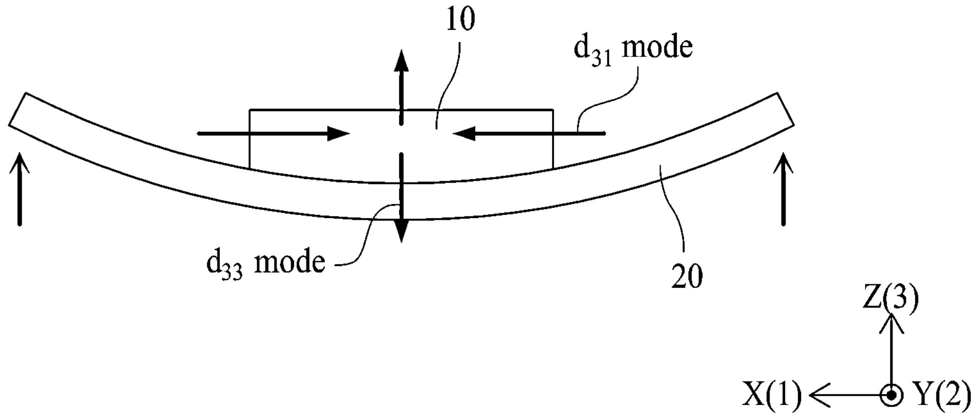

FIG. 1 illustrates an apparatus according to an embodiment of the present disclosure, and FIG. 2 is a cross-sectional view taken along line A-A' illustrated in FIG. 1. FIGS. 3A to 3D illustrate a displacement of a vibration apparatus according to an embodiment of the present disclosure, and FIGS. 4A to 4D illustrate a displacement of a vibration apparatus according to an embodiment of the present disclosure.

Referring to FIGS. 1 and 2, the vibration apparatus 1 according to an embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film piezoelectric speaker, or a film type piezoelectric composite speaker, but the terms are not limited thereto.

The vibration apparatus 1 according to an embodiment of the present disclosure may include a vibration member 20 and a vibration portion 10. For example, the vibration member 20 may be a vibration object, a display panel, a vibration plate, or a front member, but embodiments of the present disclosure are not limited thereto.

The vibration member 20 may be a display panel which displays an image. The display panel may display an image (for example, an electronic image, a digital image, a still image, or video image). For example, the display panel may output light to display an image. The display panel of the display member may be a curved display panel or one of all types of display panels such as a liquid crystal display panel, an organic light emitting display panel, a quantum dot light emitting display panel, a micro light emitting diode display panel, and an electrophoretic display panel. The display panel may be a flexible display panel. For example, the display panel may be a flexible light emitting display panel, a flexible electrophoretic display panel, a flexible electro-wetting display panel, a flexible light emitting diode display panel, or a flexible quantum dot light emitting display panel, but embodiments of the present disclosure are not limited thereto.

The vibration member 20 according to another embodiment of the present disclosure may include a vibration plate which includes one or more materials of metal, wood, rubber, plastic, glass, cloth, fiber, paper, a mirror, and leather. For example, the paper may be cone paper for speakers. For example, the cone paper may be pulp or foamed plastic, or the like, but embodiments of the present disclosure are not limited thereto.

For example, the vibration member 20 may include one or more of a display panel including a plurality of pixels displaying an image, or an interior material of a vehicle, a glass window of a vehicle, a ceiling material of a building, a glass window of a building, an interior material of a building, an interior material of an aircraft, and a glass window of an aircraft, but embodiments of the present disclosure are not limited thereto. For example, the vibration member 20 may include one or more of a display panel including a plurality of pixels displaying an image, a screen panel on which an image is projected from a display apparatus, a lighting panel, a signage panel, an interior material of a vehicular means, a glass window of a vehicular means, an exterior material of a vehicular means, a ceiling material of a building, an interior material of a building, a glass window of a building, and a mirror, but embodiments of the present disclosure are not limited thereto. For example, the display panel may be a curved display panel or one of all types of display panels such as a liquid crystal display panel, an organic light emitting display panel, a light emitting diode display panel, a quantum dot light emitting display panel, a micro light emitting diode display panel, and an electrophoretic display panel. The display panel may be a flexible display panel. For example, the display panel may be a flexible light emitting display panel, a flexible electrophoretic display panel, a flexible electro-wetting display panel, a flexible light emitting diode display panel, or a flexible quantum dot light emitting display panel, but embodiments of the present disclosure are not limited thereto. For example, the non-display panel may include a light emitting diode lighting panel (or apparatus), an organic light emitting lighting panel (or apparatus), or an inorganic light emitting lighting panel (or apparatus), but embodiments of the present disclosure are not limited thereto. For example, a vibration object may include one or more of a display panel including a plurality of pixels displaying an image, or a light emitting diode lighting panel (or apparatus), an organic light emitting lighting panel (or apparatus), or an inorganic light emitting lighting panel (or apparatus), but embodiments of the present disclosure are not limited thereto.

The vibration portion 10 may vibrate the vibration member 20. For example, the vibration portion 10 may be implemented at a rear surface of the vibration member 20 to directly vibrate the vibration member 20. For example, the vibration portion 10 may vibrate the vibration member 20 at the rear surface of the vibration member 20 to provide a user with a sound and/or a haptic feedback based on a vibration of the vibration member 20. For example, the vibration member 20 may output a sound based on a vibration of the vibration portion 10. The vibration portion 10 may output a sound by using the vibration member 20 as a vibration plate. For example, the vibration portion 10 may output a sound to a forward region of the vibration member 20 by using the vibration member 20 as a vibration plate. For example, the vibration portion 10 may generate a sound such that a traveling direction of the sound is a forward region of the display panel or the vibration member 20. The vibration portion 10 may output a sound by vibrating the vibration member 20. For example, the vibration portion 10 may directly vibrate the vibration member 20 to output sound. For example, the vibration member 20 may be a vibration object, a vibration plate, or a front member, but the terms are not limited thereto.

According to an embodiment of the present disclosure, the vibration portion 10 may vibrate based on a vibration driving signal synchronized with an image displayed by the display panel which is the vibration member 20 to vibrate the display panel. According to another embodiment of the present disclosure, the vibration portion 10 may vibrate based on a haptic feedback signal (or a tactile feedback signal) synchronized with a user touch applied to a touch panel (or a touch sensor layer) which is disposed at the display panel or embedded in the display panel, and thus, may vibrate the display panel. Accordingly, the display panel may vibrate based on a vibration of the vibration portion 10 to provide a user (or a viewer) with one or more of a sound and a haptic feedback.

The vibration portion 10 of the vibration apparatus 1 according to an embodiment of the present disclosure may include a plurality of vibration generating portions 10*a* and 10*b*.

The plurality of vibration generating portions 10*a* and 10*b* may overlap or may be stacked to be displaced (or driven or vibrated) in the same direction. For example, the plurality of vibration generating portions 10*a* and 10*b* may have substantially the same size, but embodiments of the present disclosure are not limited thereto. For example, the plurality of vibration generating portions 10*a* and 10*b* may have substantially the same size within an error range of a manufacturing process, but embodiments of the present disclosure are not limited thereto. Therefore, the plurality of vibration generating portions 10*a* and 10*b* may maximize an amplitude displacement of the vibration portion 10 and/or an amplitude displacement of the vibration member 20. One side (an end portion, an end, an outer surface, or each corner portion) of each of the plurality of vibration generating portions 10*a* and 10*b* may be aligned in a virtual extension line extending in a thickness direction Z, or may be disposed in the virtual extension line.

For example, in at least one of the plurality of vibration generating portions 10*a* and 10*b*, a displacement direction and an amplitude direction of each of the plurality of vibration generating portions 10*a* and 10*b* may not match those of the other vibration generating portion, and thus, an amplitude displacement of the vibration portion 10 may not be maximized. For example, when at least one of the plurality of vibration generating portions 10*a* and 10*b* has a different size outside the error range of the manufacturing process, a displacement direction and an amplitude direction of each of the plurality of vibration generating portions 10*a* and 10*b* may not match those of the other vibration generating portion, and thus, an amplitude displacement of the vibration portion 10 may not be maximized. When at least one of the plurality of vibration generating portions 10*a* and 10*b* is displaced in a different direction, a displacement direction of each of the plurality of vibration generating portions 10*a* and 10*b* may not match that of the other vibration generating portion, and thus, an amplitude displacement of the vibration portion 10 may not be maximized.

The vibration portion 10 according to an embodiment of the present disclosure may include two or more vibration generating portions 10*a* and 10*b* which are stacked to be displaced (or vibrated or driven) in the same direction. In the following description, an example where the vibration portion 10 includes first and second vibration generating portions 10*a* and 10*b* will be described.

According to an embodiment of the present disclosure, the vibration portion 10 may be connected to or disposed on the vibration member 20. For example, the first vibration generating portion 10*a* may be connected to or disposed on the vibration member 20. The first vibration generating portion 10*a* may be connected to or disposed on the vibration member 20 by using a first adhesive layer 31.

The first and second vibration generating portions 10*a* and 10*b* according to an embodiment of the present disclosure may include a first cover member 41 (or first protection member 41) and a second cover member 42 (or second protection member 42). The first cover member 41 may be disposed between the first and second vibration generating portions 10*a* and 10*b*. The second cover member 42 may be disposed on the second vibration generating portion 10*b*. A separate cover member may not be disposed on a bottom surface of the first vibration generating portion 10*a*. For example, the first vibration generating portion 10*a* may be directly connected to or disposed on the vibration member 20 by using the first adhesive layer 31 without the separate cover member.

The first vibration generating portion 10*a* may include a vibration layer 11, a first electrode layer 12, and a second electrode layer 13. The second vibration generating portion 10*b* may include a vibration layer 14, a first electrode layer 15, and a second electrode layer 16.

The vibration layers 11 and 14 of the first and second vibration generating portions 10*a* and 10*b* may include a piezoelectric material (or an electro active material) having a piezoelectric effect. For example, the piezoelectric material may have a characteristic where pressure or twisting is applied to a crystalline structure by an external force, a potential difference occurs due to dielectric polarization (or dielectric poling) caused by a relative position change of a positive (+) ion and a negative (−) ion, and a vibration is generated by an electric field based on a voltage applied thereto. The vibration layer 11 may include a ceramic-based material for implementing a relatively high vibration, or may include a piezoelectric ceramic having a perovskite-based crystalline structure. For example, the vibration layer 11 may be referred to as the terms such as a vibration layer, a piezoelectric layer, a piezoelectric material layer, an electro active layer, a vibration portion, a piezoelectric material portion, an electro active portion, a piezoelectric structure, a piezoelectric composite layer, a piezoelectric composite, or a piezoelectric ceramic composite, but the terms are not limited thereto.

The vibration layers 11 and 14 may include a ceramic-based material for implementing a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "0" may be anions. For example, the chemical formula "$ABO_3$" may include one or more of lead(II) titanate ($PbTiO_3$), lead zirconate ($PbZr_{03}$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization (or poling), and a piezoelectric effect may be generated based on the variation of the polarization. In a perovskite crystalline structure including $PbTiO_3$, a position of a Ti ion corresponding to a center ion may be changed to vary polarization (or poling), and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by using an external stress or a magnetic field, and thus, a piezoelectric effect may be generated. Polarization (or poling) may be high at a morphotropic phase boundary (MPB) of a tetragonal structure and a rhombohedral structure, and polarization (or poling) may be easily realigned, thereby obtaining a high piezoelectric characteristic.

The vibration layers 11 and 14 according to another embodiment of the present disclosure may include one or more materials among lead (Pb), zirconium (Zr), titanium (Ti), zinc (Zn), nickel (Ni), and niobium (Nb), but embodiments of the present disclosure are not limited thereto.

The vibration layers 11 and 14 according to another embodiment of the present disclosure may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. Also, the vibration layer 11 may include at least one or more among calcium titanate ($CaTiO_3$), $BaTiO_3$, and $SrTiO_3$, each without Pb, but embodiments of the present disclosure are not limited thereto.

The vibration layers 11 and 14 of the first and second vibration generating portions 10*a* and 10*b* may be polarized (or poling) by a certain voltage applied to the first electrode layers 12 and 15 and the second electrode layers 13 and 16 in a certain temperature atmosphere or a temperature atmosphere which is changed from a high temperature to a room temperature, but embodiments of the present disclosure are not limited thereto. For example, when a vibration driving signal (or a sound signal or a voice signal) is applied, the vibration layers 11 and 14 may alternately and repeatedly contract and expand based on an inverse piezoelectric effect based on a sound signal (or a sound signal or a voice signal) applied from the outside to the first electrode layers 12 and 15 and the second electrode layers 13 and 16, and thus, may vibrate. For example, the vibration layers 11 and 14 may vibrate the vibration member 20 based on a vertical-direction vibration $d_{33}$ and a lateral-direction vibration $d_{31}$ by using the first electrode layers 12 and 15 and the second electrode layers 13 and 16.

The vibration layers 11 and 14 of the first and second vibration generating portions 10*a* and 10*b* may be polarized (or poling) in the same direction. For example, the vibration layers 11 and 14 of the first and second vibration generating portions 10*a* and 10*b* may be configured so that a polarization direction (or poling direction) faces an upward direction with respect to the thickness direction Z of the vibration member 20. Alternatively, the vibration layers 11 and 14 of the first and second vibration generating portions 10*a* and 10*b* may be configured so that a polarization direction (or a poling direction) faces a downward direction with respect to the thickness direction Z of the vibration member 20. The first and second vibration generating portions 10*a* and 10*b* may be stacked and may have the same polarization direction (or same poling direction), and thus, the vibration member 20 may identically vibrate based on the vertical-direction vibration $d_{33}$. For example, the vibration layer 11 of the first vibration generating portion 10*a* may vibrate the vibration member 20 based on the vertical-direction vibration $d_{33}$ by using the first electrode layer 12 and the second electrode layer 13. The vibration layer 14 of the second vibration generating portion 10*b* may vibrate the vibration member 20 based on the vertical-direction vibration $d_{33}$ by using the first electrode layer 15 and the second electrode layer 16. The vertical direction of each of the vibration layers 11 and 14 may increase a displacement of a vibration member (or a vibration plate or a vibration object) based on contraction and expansion performed in the vertical direction, thereby more enhancing a vibration characteristic.

The first electrode layers 12 and 15 of the first and second vibration generating portions 10*a* and 10*b* may be disposed on first surfaces (or lower surfaces) of the vibration layers 11 and 14. The first electrode layers 12 and 15 may have the same size as that of each of the vibration layers 11 and 14, or may have a size which is less than that of each of the vibration layers 11 and 14. For example, the first electrode layers 12 and 15 may be formed on the whole first surfaces, except edge portions (or periphery portions), of the vibration layers 11 and 14.

The second electrode layers 13 and 16 of the first and second vibration generating portions 10*a* and 10*b* may be disposed on second surfaces (or upper surfaces), which differ from or are opposite to the first surfaces, of the vibration layers 11 and 14. The second electrode layers 13 and 16 may have the same size as that of each of the vibration layers 11 and 14, or may have a size which is less than that of each of the vibration layers 11 and 14. For example, the second electrode layers 13 and 16 may be formed on the whole second surfaces, except the edge portions (or periphery portions), of the vibration layers 11 and 14. For example, the second electrode layers 13 and 16 may have the same shape as that of each of the vibration layers 11 and 14, but embodiments of the present disclosure are not limited thereto.

Each of the first electrode layers 12 and 15 and the second electrode layers 13 and 16 according to an embodiment of the present disclosure may include carbon, but embodiments of the present disclosure are not limited thereto. For example, one or more of the first electrode layers 12 and 15 and the second electrode layers 13 and 16 may include a transparent conductive material, a semitransparent conductive material, or an opaque conductive material. For example, the transparent or semitransparent conductive material may include indium tin oxide (ITO) or indium zinc oxide (IZO), but embodiments of the present disclosure are not limited thereto. The opaque conductive material may include gold (Au), silver (Ag), platinum (Pt), palladium (Pd), molybdenum (Mo), magnesium (Mg), or glass frit-containing Ag, or an alloy thereof, but embodiments of the present disclosure are not limited thereto. According to another embodiment of the present disclosure, each of the first electrode layers 12 and 15 and the second electrode layers 13 and 16 may include Ag having low resistivity, so as to enhance an electrical characteristic and/or a vibration characteristic of each of the vibration layers 11 and 14. For example, carbon may be a carbon material including graphite, carbon black, ketjen black, and carbon nanotube.

In each of the first and second vibration generating portions 10*a* and 10*b*, the first electrode layer 12 of the first vibration generating portion 10*a* may be disposed closer to the vibration member 20 than the second electrode layer 13, but embodiments of the present disclosure are not limited thereto. For example, in the vibration portion 10 including the first and second vibration generating portions 10*a* and 10*b* according to the present disclosure, the first electrode layer of each of the first and second vibration generating portions 10*a* and 10*b* may be disposed closer to the vibration member 20 than the second electrode layer.

The vibration layers 11 and 14 may be polarized (or poling) by a certain voltage applied to the first electrode layers 12 and 15 and the second electrode layers 13 and 16 in a certain temperature atmosphere or a temperature atmosphere which is changed from a high temperature to a room temperature, but embodiments of the present disclosure are not limited thereto. For example, the vibration portion 10 may alternately and repeatedly contract and expand based on an inverse piezoelectric effect based on a sound signal (or a sound signal or a voice signal) applied from the outside to the first electrode layers 12 and 15 and the second electrode layers 13 and 16, and thus, may be displaced or may vibrate (or drive).

The vibration layer 11 of the first vibration generating portion 10*a* may have the same size as that of the vibration layer 14 of the second vibration generating portion 10*b*. In order to maximize or increase a displacement amount or an amplitude range of the vibration portion 10, the vibration layer 11 of the first vibration generating portion 10*a* may substantially overlap the vibration layer 14 of the second vibration generating portion 10*b* within the error range of the manufacturing process without being staggered. For example, the vibration layer 11 of the first vibration generating portion 10*a* and the vibration layer 14 of the second vibration generating portion 10*b* may be implemented in a stack structure which overlaps to have the same size without being staggered, and thus, a displacement amount or an amplitude range of the vibration portion 10 may be maximized or may increase. For example, the vibration layer 11 of the first vibration generating portion 10*a* and the vibration layer 14 of the second vibration generating portion 10*b* may be implemented in a stack structure which accurately overlaps to have the same size without being staggered, and thus, a displacement amount or an amplitude range of the vibration portion 10 may be maximized or may increase.

In the first vibration generating portion 10*a*, the first cover member 41 may be disposed on the second electrode layer 13. The first cover member 41 may protect the second electrode layer 13. For example, the first cover member 41 may include a plastic material, a fiber material, or a wood material, but embodiments of the present disclosure are not limited thereto.

In the second vibration generating portion 10*b*, the second cover member 42 may be disposed on the second electrode layer 16. The second cover member 42 may protect the second electrode layer 16. For example, the second cover member 42 may include a plastic material, a fiber material, or a wood material, but embodiments of the present disclosure are not limited thereto.

The first cover member 41 and the second cover member 42 respectively included in the first and second vibration generating portions 10*a* and 10*b* may include the same material or different materials. Each of the first cover member 41 and the second cover member 42 may be a polyimide film or a polyethylene terephthalate film, but embodiments of the present disclosure are not limited thereto.

Each of the first and second vibration generating portions 10*a* and 10*b* may include at least one first adhesive layer 31, second adhesive layer 32, third adhesive layer 33, and fourth adhesive layer 34.

In the first vibration generating portion 10*a*, the first adhesive layer 31 may be disposed between the vibration layer 11 and the vibration member 20. For example, the first adhesive layer 31 may be disposed between the vibration member 20 and the first electrode layer 12 on the vibration layer 11. The first adhesive layer 31 among the first adhesive layer 31, the second adhesive layer 32, the third adhesive layer 33, and the fourth adhesive layer 34 of each of the first and second vibration generating portions 10*a* and 10*b* may have a function of protecting a member as well as a function of attaching members. For example, the first adhesive layer 31 may include one or more of a thermal curable adhesive, a UV-curable adhesive, and a thermal bonding adhesive. For example, the first adhesive layer 31 may include a thermal bonding adhesive. The thermal bonding adhesive may be a thermal active type or a thermal curable type. For example, the first adhesive layer 31 including the thermal bonding adhesive may connect or couple the first vibration generating portion 10*a* to the vibration member 20 by heat and pressure. For example, the first adhesive layer 31 including the thermal bonding adhesive may connect or couple the first vibration generating portion 10*a* to the vibration member 20 by heat.

In the first vibration generating portion 10*a*, the second adhesive layer 32 may be disposed between the vibration layer 11 and the first cover member 41. For example, the second adhesive layer 32 may be disposed between the first cover member 41 and the second electrode layer 13 on the vibration layer 11. The first cover member 41 may be disposed on the first vibration generating portion 10*a* by the second adhesive layer 32. For example, the first cover member 41 may be coupled or connected to a second surface (or the second electrode layer 13) of the first vibration generating portion 10*a* by a laminating process using the second adhesive layer 32.

In the first vibration generating portion 10*a*, the first and second adhesive layers 31 and 32 may be connected or coupled to each other between the first cover member 41 and the vibration member 20. For example, in the first vibration generating portion 10*a*, the first and second adhesive layers 31 and 32 may be connected or coupled to each other at an edge portion (or a periphery portion) between the first cover member 41 and the vibration member 20. Accordingly, in the first vibration generating portion 10*a*, the vibration layer 11 may be surrounded by the first and second adhesive layers 31 and 32. For example, the first and second adhesive layers 31 and 32 may fully surround all of the first vibration generating portion 10*a*.

In the second vibration generating portion 10*b*, the third adhesive layer 33 may be disposed between the vibration layer 14 and the first cover member 41. For example, the third adhesive layer 33 may be disposed between the first cover member 41 and the first electrode layer 15 on the vibration layer 14. The first cover member 41 may be disposed on a first surface (or the first electrode layer 15) of the second vibration generating portion 10*b* by the third adhesive layer 33. For example, the first cover member 41 may be coupled or connected to a first surface (or the first electrode layer 15) of the second vibration generating portion 10*b* by a laminating process using the third adhesive layer 33.

In the second vibration generating portion 10*b*, the fourth adhesive layer 34 may be disposed between the vibration layer 14 and the second cover member 42. For example, the fourth adhesive layer 34 may be disposed between the second cover member 42 and the second electrode layer 16 on the vibration layer 14. The second cover member 42 may be disposed on the second vibration generating portion 10*b* by the fourth adhesive layer 34. For example, the second cover member 42 may be coupled or connected to a second surface (or the second electrode layer 16) of the second vibration generating portion 10*b* by a laminating process using the fourth adhesive layer 34.

In the second vibration generating portion 10*b*, the third and fourth adhesive layers 33 and 34 may be connected or coupled to each other between the first cover member 41 and the second cover member 42. For example, in the second vibration generating portion 10*b*, the third and fourth adhesive layers 33 and 34 may be connected or coupled to each other at an edge portion (or a periphery portion) between the first cover member 41 and the second cover member 42. Accordingly, in the second vibration generating portion 10*b*, the vibration layer 14 may be surrounded by the third and fourth adhesive layers 33 and 34. For example, the third and fourth adhesive layers 33 and 34 may fully surround all of the second vibration generating portion 10*b*.

In each of the first and second vibration generating portions 10*a* and 10*b*, each of the first, second, third, and fourth adhesive layers 31 to 34 may include an electrical insulation material. For example, each of the first, second, third, and fourth adhesive layers 31 to 34 may include an electrical insulation material which has adhesive properties and is capable of compression and decompression. For example, one or more of the first, second, third, and fourth adhesive layers 31 to 34 may include epoxy resin, acryl resin, silicone resin, or urethane resin, but embodiments of the present disclosure are not limited thereto.

The vibration portion 10 according to an embodiment of the present disclosure may be displaced (or vibrated or driven) in a $d_{33}$ direction (or a Z-axis direction) based on the vibration driving signal with respect to the thickness direction Z of the vibration member 20. The first and second vibration generating portions 10*a* and 10*b* may be configured so that a horizontal length b (or an X-axis length) and a vertical length a (or a Y-axis length) have different shapes, so as to maximize a $d_{33}$-direction displacement. For example, the vibration portion 10 may be configured so that one of the horizontal length b or the vertical length a is longer. For example, the horizontal length b of the vibration portion 10 may be set to be longer than the vertical length a. For example, the horizontal length b of the vibration portion 10 may be 6 cm to 12 cm, and the vertical length a of the vibration portion 10 may be 3 cm to 6 cm. For example, the vibration portion 10 may be configured in a rectangular structure, but embodiments of the present disclosure are not limited thereto.

Referring to FIGS. 3A to 3D, the vibration portion 10 according to an embodiment of the present disclosure may be configured so that the horizontal length b is longer than the vertical length a. The vibration portion 10 may be configured so that a polarization direction (or a poling direction) toward an upward direction with respect to the thickness direction Z of the vibration member 20. Also, as illustrated in FIGS. 3A to 3D, a constant voltage (+) (or a positive voltage) may be applied to an upper electrode (or a second electrode) of the vibration portion 10, and an inverse voltage (−) (or a negative voltage) may be applied to a lower electrode (or a first electrode) of the vibration portion 10. Therefore, a traveling direction of polarization (or poling) may meet the constant voltage (+), and thus, the vibration portion 10 may be deformed to be compressed in the thickness direction Z and to extend to an outer side on a plane. In the vibration portion 10, because the horizontal length b is longer than the vertical length a, deformation in a $d_{31}$ direction (or a horizontal direction) may be greater performed than deformation in a $d_{33}$ direction (or a vertical direction). As illustrated in FIGS. 3A to 3D, the inverse voltage (−) (or the negative voltage) may be applied to the upper electrode (or the second electrode) of the vibration portion 10, and the constant voltage (+) (or the positive voltage) may be applied to the lower electrode (or the first electrode) of the vibration portion 10. Accordingly, a traveling direction of polarization (or poling) may meet the inverse voltage (−), and thus, the vibration portion 10 may be deformed to extend in the thickness direction Z and contract from the outer side on the plane. In the vibration portion 10, because the horizontal length b is longer than the vertical length a, deformation in the $d_{33}$ direction (or the vertical direction) may be greater performed than deformation in the $d_{31}$ direction (or the horizontal direction).

Figure 4A:
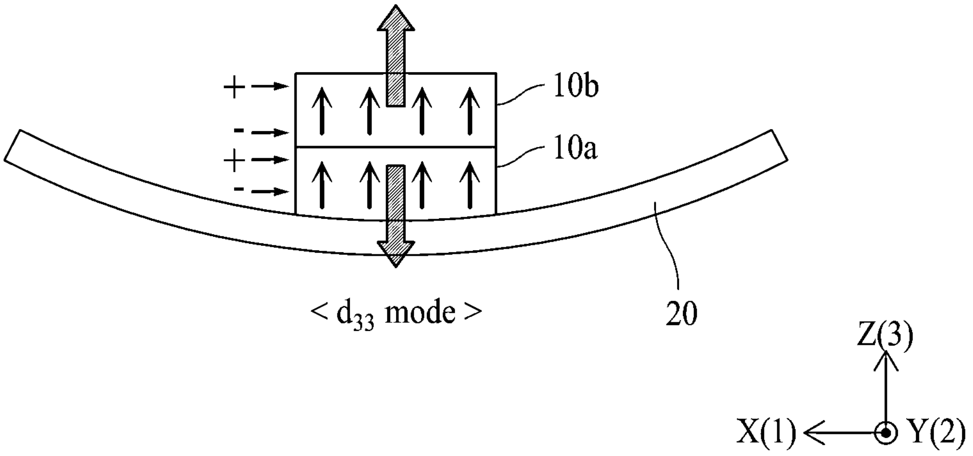
FIGS. 4A to 4D illustrate a displacement of a vibration apparatus according to an embodiment of the present disclosure.
Figure 4B:
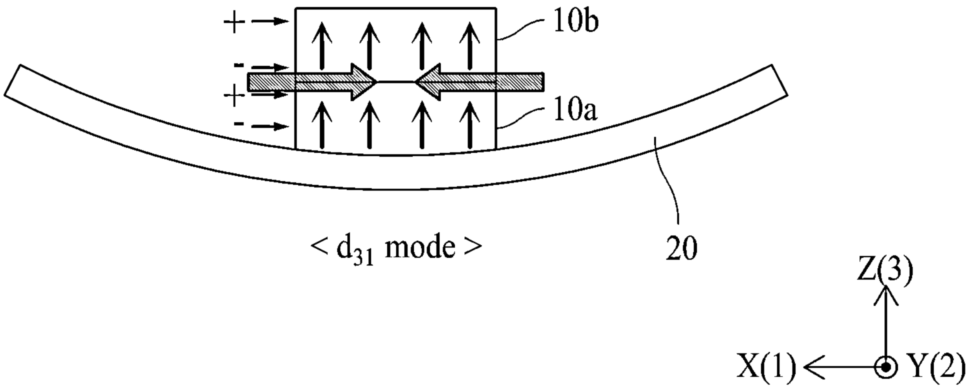
Figure 4C:
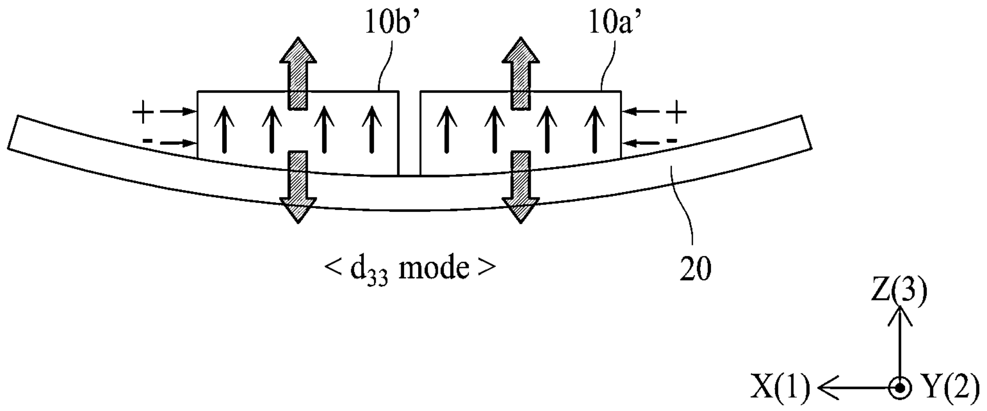
Figure 4D:
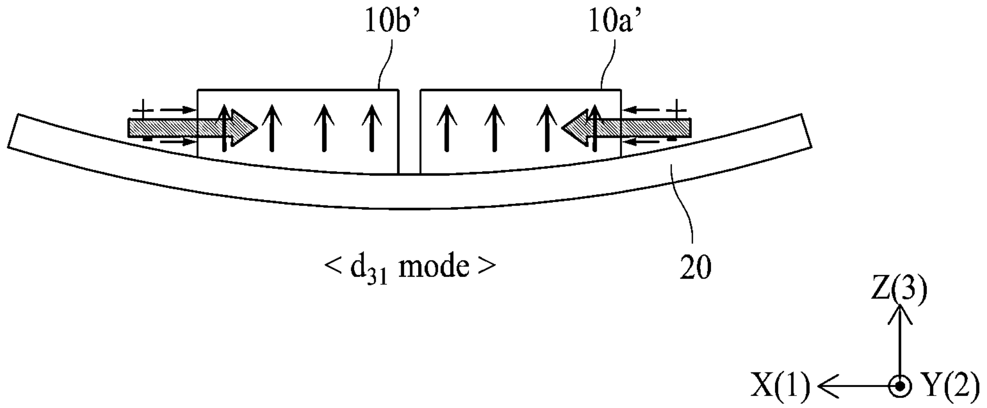

Referring to FIGS. 4A to 4D, as illustrated in FIGS. 4A and 4B, the first and second vibration generating portions 10*a* and 10*b* which are stacked may be configured with respect to the thickness direction Z of the vibration member 20. In the vibration portion 10 having such a stack structure, a vibration displacement may more concentrate than a vibration portion (FIGS. 4C and 4D) disposed in parallel in a horizontal direction X or Y, and thus, a displacement of a vibration member (or a vibration plate or a vibration object) may increase, thereby more enhancing a vibration characteristic. For example, referring to FIGS. 4A and 4C, it may be seen that the vibration portion 10 according to an embodiment of the present disclosure is relatively greater deformed in the $d_{33}$ direction (or the vertical direction). Referring to FIGS. 4B and 4D, it may be seen that the vibration portion 10 according to an embodiment of the present disclosure is relatively greater deformed in the $d_{31}$ direction (or the horizontal direction).

FIGS. 5A to 5D are perspective views illustrating various embodiments of the vibration layer illustrated in FIG. 2. In FIGS. 5A to 5D, a vibration layer 11 of the first vibration generating portion 10*a* among the first and second vibration generating portions 10*a* and 10*b* of the vibration portion 10 is illustrated, but embodiments of the present disclosure are not limited thereto and may be identically applied to a vibration layer 14 of the second vibration generating portion 10*b*.

Referring to FIGS. 5A to 5D, a vibration layer 11 according to an embodiment of the present disclosure may include a plurality of first portions 11*a* and a plurality of second portions 11*b*.

Figure 5A:
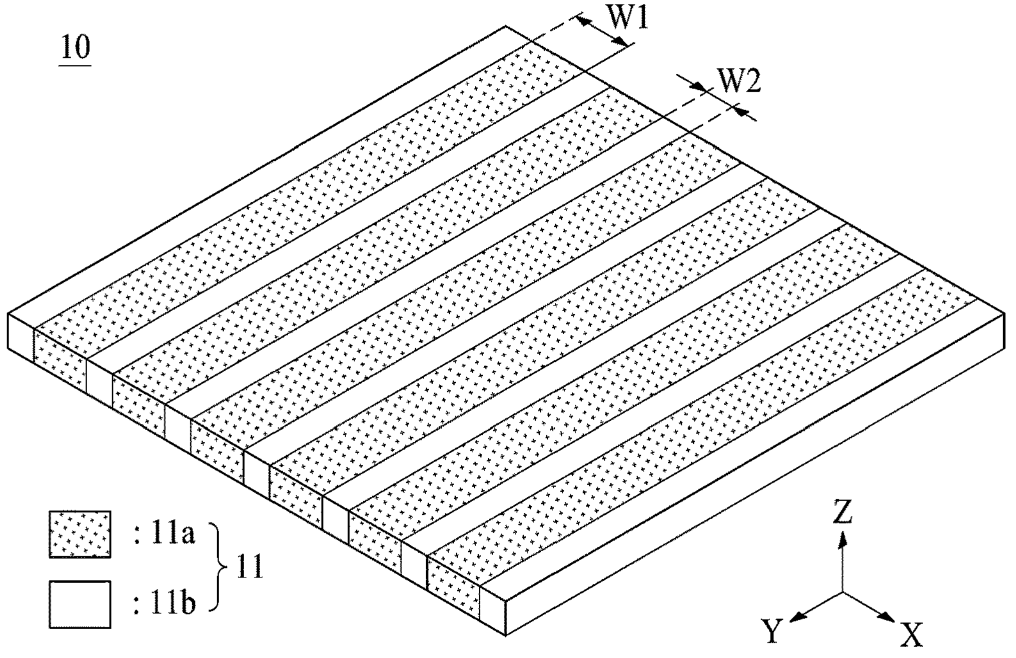
FIGS. 5A to 5D are perspective views illustrating various embodiments of a vibration layer illustrated in FIG. 2.

Referring to FIG. 5A, a vibration layer 11 according to an embodiment of the present disclosure may include a plurality of first portions 11*a* and a plurality of second portions 11*b*. For example, the plurality of first portions 11*a* and the plurality of second portions 11*b* may be alternately and repeatedly arranged in a first direction X (or a second direction Y). For example, the first direction X may be a widthwise direction of the vibration layer 11 and the second direction Y may be a lengthwise direction of the vibration layer 11 intersecting with the first direction X, but embodiments of the present disclosure are not limited thereto and the first direction X may be the lengthwise direction of the vibration layer 11 and the second direction Y may be the widthwise direction of the vibration layer 11.

Each of the plurality of first portions 11*a* may include an inorganic material portion. The inorganic material portion may include a piezoelectric material, a composite piezoelectric material, or an electro active material having a piezoelectric effect.

Each of the plurality of first portions 11*a* may include a ceramic-based material for implementing a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "0" may be anions. For example, the first portions 11*a* may include one or more of lead(II) titanate ($PbTiO_3$), lead zirconate ($PbZr_{03}$), lead zirconate titanate ($PbZrTiO_3$), barium titanate ($BaTiO_3$), and strontium titanate ($SrTiO_3$), but embodiments of the present disclosure are not limited thereto. For example, each of the plurality of first portions 11*a* may include substantially the same piezoelectric material as that of the vibration layer 11 described above with reference to FIGS. 2 to 4, and thus, like reference numerals refer to like elements and their repeated descriptions are omitted.

Each of the plurality of first portions 11*a* according to an embodiment of the present disclosure may be disposed between the plurality of second portions 11*b*, have a first width W1 parallel to the first direction X (or the second direction Y), and have a length parallel to the second direction Y (or the first direction X). Each of the plurality of second portions 11*b* may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 11*a* and the second portion 11*b* may include a line shape or a stripe shape having the same size or different sizes. Accordingly, the vibration layer 11 may have a 2-2 composite structure having a piezoelectric characteristic of a 2-2 vibration mode, and thus, may have a resonance frequency of 20 kHz or less, but embodiments of the present disclosure are not limited thereto. For example, the resonance frequency of the vibration layer 11 may vary based on one or more of a shape, a length, and a thickness thereof.

In the vibration layer 11, the plurality of first portions 11*a* and the plurality of second portions 11*b* may be disposed (or arranged) in parallel on the same plane (or the same layer). Each of the plurality of second portions 11*b* may be configured to fill a gap between two adjacent first portions 11*a*, and thus, may be connected to or attached on an adjacent first portion 11*a*. Accordingly, the vibration layer 11 may extend by a desired size or length based on lateral coupling (or connection) of the first portion 11*a* and the second portion 11*b*.

In the vibration layer 11, the width W2 of each of the plurality of second portions 11*b* may decrease progressively in a direction from a center portion of the vibration layer 11 or the vibration apparatus 1 to both edge portions (or both ends or both peripheries portions) thereof.

According to an embodiment of the present disclosure, when the vibration layer 11 or the vibration apparatus 1 vibrates in a vertical direction Z (or a thickness direction), a second portion 11*b* having a largest width W2 among the plurality of second portions 11*b* may be disposed at a portion on which a largest stress concentrates. When the vibration layer 11 or the vibration apparatus 1 vibrates in the vertical direction Z, a second portion 11*b* having a smallest width W2 among the plurality of second portions 11*b* may be disposed at a portion where a relatively smallest stress occurs. For example, the second portion 11*b* having the largest width W2 among the plurality of second portions 11*b* may be disposed at a center portion of the vibration layer 11, and the second portion 11*b* having the smallest width W2 among the plurality of second portions 11*b* may be disposed at both edge portions (or both peripheries portions) of the vibration layer 11. Accordingly, when the vibration layer 11 or the vibration apparatus 1 vibrates in the vertical direction Z, an overlap of a resonance frequency or interference of a sound wave occurring at a portion on which a largest stress concentrates may be minimized, and thus, dip of a sound pressure level occurring in a low-pitched sound band may be reduced. For example, the flatness of a sound characteristic may be a magnitude of a deviation between a highest sound pressure level and a lowest sound pressure level.

In the vibration layer 11, the plurality of first portions 11*a* may have different sizes (or widths). For example, a size (or a width) of each of the plurality of first portions 11*a* may decrease or increase progressively in a direction from the center portion of the vibration layer 11 or the vibration apparatus 1 to both edge portions (or both ends portions or both peripheries portions) thereof. In this case, a sound pressure level characteristic of a sound of the vibration layer 11 may be enhanced by various unique vibration frequencies based on vibrations of the plurality of first portions 11*a* having different sizes, and a reproduction band of a sound may extend.

Each of the plurality of second portions 11*b* may be disposed between the plurality of first portions 11*a*. Therefore, in the vibration layer 11 or the vibration apparatus 1, vibration energy based on a link in a unit lattice of the first portion 11*a* may be increased by the second portion 11*b*, and thus, a vibration characteristic may increase and a piezoelectric characteristic and flexibility may be secured. For example, the second portion 11*b* may include one of an epoxy-based polymer, an acrylic-based polymer, and a silicone-based polymer, but embodiments of the present disclosure are not limited thereto.

Each of the plurality of second portions 11*b* according to an embodiment of the present disclosure may be configured with an organic material portion. For example, the organic material portion may be disposed between two adjacent inorganic material portions, and thus, may absorb an impact applied to the inorganic material portion (or the first portion) and may release a stress concentrating on the inorganic material portion, thereby enhancing the durability of the vibration layer 11 or the vibration apparatus 1 and realizing the flexibility of the vibration layer 11 or the vibration apparatus 1. Accordingly, the vibration apparatus 1 may have flexibility, and thus, may be bent in a shape matching a shape of a curved portion of a supporting member. For example, the vibration apparatus 1 may have flexibility, and thus, may be arranged along a shape of the curved portion of the supporting member.

The second portion 11*b* according to an embodiment of the present disclosure may have a modulus and viscoelasticity that are lower than those of the first portion 11*a*, and thus, the second portion 11*b* may enhance the reliability of the first portion 11*a* vulnerable to an impact due to a fragile characteristic of the first portion 11*a*. For example, the second portion 11*b* may include a material having a loss coefficient of about 0.01 to about 1 and a modulus of about 0.1 GPa (GigaPascal) to about 10 GPa (GigaPascal).

The organic material portion included in the second portion 11*b* may include an organic material, an organic polymer, an organic piezoelectric material, or an organic non-piezoelectric material having a flexible characteristic compared to the inorganic material portion which is the first portion 11*a*. For example, the second portion 11*b* may be referred to as an adhesive portion, a flexible portion, a bending portion, a damping portion, or a ductile portion, or the like, but embodiments of the present disclosure are not limited thereto.

The plurality of first portions 11*a* and the plurality of second portions 11*b* may be disposed on (or connected to) the same plane, and thus, the vibration layer 11 according to the present embodiment may have a single thin film form. For example, the vibration layer 11 may have a structure where the plurality of first portions 11*a* are connected to one side thereof. For example, the vibration layer 11 may have a structure where the plurality of first portions 11*a* are connected in all of the vibration layer 11. For example, the vibration layer 11 may be vibrated in a vertical direction by the first portion 11*a* having a vibration characteristic and may be bent in a curved shape by the second portion 11*b* having flexibility. In the vibration layer 11 according to the present embodiment, a size of the first portion 11*a* and a size of the second portion 11*b* may be set based on a piezoelectric characteristic and flexibility needed for the vibration layer 11 or the vibration apparatus 1. For example, in the vibration layer 11 requiring a piezoelectric characteristic rather than flexibility, a size of the first portion 11*a* may be set to be greater than that of the second portion 11*b*. In another embodiment of the present disclosure, in the vibration layer 11 requiring flexibility rather than a piezoelectric characteristic, a size of the second portion 11*b* may be set to be greater than that of the first portion 11*a*. Accordingly, a size of the vibration layer 11 may be adjusted based on a desired characteristic, and thus, the vibration layer 11 may be easily designed.

The first electrode layer 12 may be disposed on a first surface (or a lower surface) of the vibration layer 11. The first electrode layer 12 may be disposed on or coupled to a first surface of each of the plurality of first portions 11*a* and a first surface of each of the plurality of second portions 11*b* in common and may be electrically connected to the first surface of each of the plurality of first portions 11*a*. For example, the first electrode layer 12 may have a single electrode (or one electrode) form disposed on the whole first surface of the vibration layer 11. For example, the first electrode layer 12 may have substantially the same shape as the vibration layer 11, but embodiments of the present disclosure are not limited thereto.

The second electrode layer 13 may be disposed on a second surface (or a rear surface), which differs from (or opposite to) the first surface, of the vibration layer 11. The second electrode layer 13 may be disposed on or coupled to a second surface of each of the plurality of first portions 11*a* and a second surface of each of the plurality of second portions 11*b* in common and may be electrically connected to the second surface of each of the plurality of first portions 11*a*. For example, the second electrode layer 13 may have a single electrode (or one electrode) form disposed on the whole second surface of the vibration layer 11. For example, the second electrode layer 13 may have substantially the same shape as the vibration layer 11, but embodiments of the present disclosure are not limited thereto.

One or more of the first electrode layer 12 and the second electrode layer 13 according to an embodiment of the present disclosure may include a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), molybdenum (Mo), magnesium (Mg), or an alloy thereof, but embodiments of the present disclosure are not limited thereto.

The vibration layer 11 may be polarized (or poling) by a certain voltage applied to the first electrode layer 12 and the second electrode layer 13 in a certain temperature atmosphere or a temperature atmosphere which is changed from a high temperature to a room temperature, but embodiments of the present disclosure are not limited thereto. For example, when a vibration driving signal (or a voice signal) is applied, the vibration layer 11 may alternately and repeatedly contract and expand based on an inverse piezoelectric effect based on a sound signal (or a voice signal) applied from the outside to the first electrode layer 12 and the second electrode layer 13, and thus, may vibrate. For example, the vibration layer 11 may vibrate based on a vibration $d_{31}$ of at least one of the first electrode layer 12 and the second electrode layer 13 in a planar direction. A displacement of a vibration member may increase based on contraction and expansion of the vibration layer 11 in the planar direction, and thus, a vibration may be more enhanced.

Figure 5B:
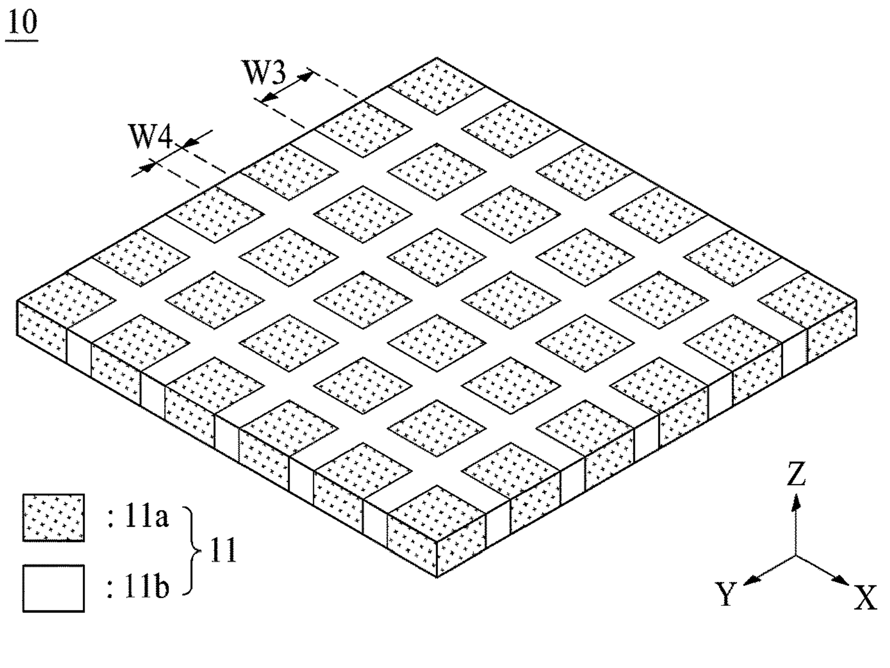

Referring to FIG. 5B, a vibration layer 11 according to an embodiment of the present disclosure may include a plurality of first portions 11*a* which are apart from one another in a first direction X and a second direction Y and a second portion 11*b* disposed between the plurality of first portions 11*a*.

The plurality of first portions 11*a* may be disposed apart from one another in each of the first direction X and the second direction Y. For example, the plurality of first portions 11*a* may have a hexahedral shape having the same size and may be arranged in a lattice shape. Each of the plurality of first portions 11*a* may include substantially the same material as that of the first portion 11*a* described above with reference to FIG. 5A, and thus, like reference numerals refer to like elements and their repeated descriptions are omitted.

The second portion 11*b* may be disposed between the plurality of first portions 11*a* in each of the first direction X and the second direction Y. The second portion 11*b* may be configured to fill a gap between two adjacent first portions 11*a* or to surround each of the plurality of first portions 11*a*, and thus, may be connected to or attached on an adjacent first portion 11*a*. According to an embodiment of the present disclosure, a width of a second portion 11*b* disposed between two first portions 11*a* adjacent to each other in the first direction X may be the same as or different from that of the first portion 11*a*, and a width of a second portion 11*b* disposed between two first portions 11*a* adjacent to each other in the second direction Y may be the same as or different from that of the first portion 11*a*. The second portion 11*b* may include substantially the same material as that of the second portion 11*b* described above with reference to FIG. 5A, and thus, like reference numerals refer to like elements and their repeated descriptions are omitted.

As described above, the vibration layer 11 according to a first modification embodiment of the present disclosure may include a 1-3 composite structure having a piezoelectric characteristic of a 1-3 vibration mode, and thus, may have a resonance frequency of 30 MHz or less, but embodiments of the present disclosure are not limited thereto. For example, the resonance frequency of the vibration layer 11 may vary based on one or more of a shape, a length, or a thickness thereof.

Figure 5C:
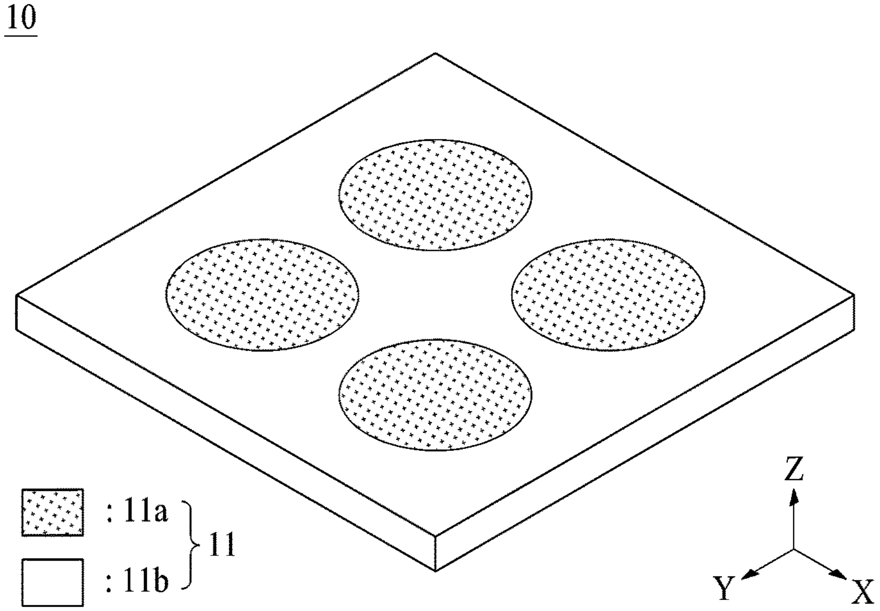

Referring to FIG. 5C, a vibration layer 11 according to another embodiment of the present disclosure may include a plurality of first portions 11*a* which are apart from one another in a first direction X and a second direction Y and a second portion 11*b* which surrounds each of the plurality of first portions 11*a*.

Each of the plurality of first portions 11*a* may have a planar structure having a circular shape. For example, each of the plurality of first portions 11*a* may have a circular plate shape, but embodiments of the present disclosure are not limited thereto. For example, each of the plurality of first portions 11*a* may have a dot shape including an oval shape, a polygonal shape, or a donut shape. Each of the plurality of first portions 11*a* may include substantially the same piezoelectric material as that of the first portion 11*a* described above with reference to FIG. 5A, and thus, like reference numerals refer to like elements and their repeated descriptions are omitted.

The second portion 11*b* may be disposed between the plurality of first portions 11*a* in each of the first direction X and the second direction Y. The second portion 11*b* may be configured to surround each of the plurality of first portions 11*a*, and thus, may be connected to or attached on a lateral surface of each of the plurality of first portions 11*a*. The plurality of first portions 11*a* and the second portion 11*b* may be disposed (or arranged) in parallel on the same plane (or the same layer). The second portion 11*b* may include substantially the same piezoelectric material as that of the second portion 11*b* described above with reference to FIG. 5A, and thus, like reference numerals refer to like elements and their repeated descriptions are omitted.

Figure 5D:
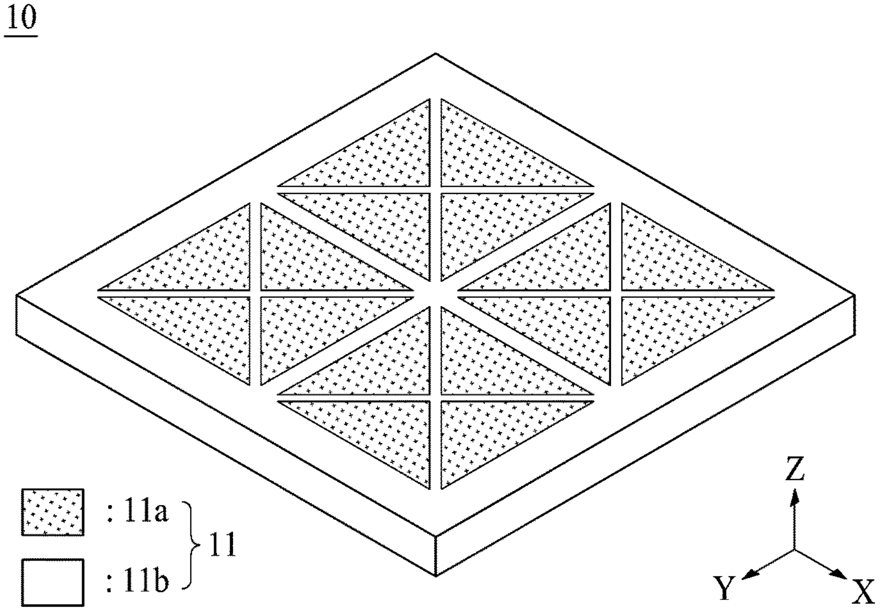

Referring to FIG. 5D, a vibration layer 11 according to another embodiment of the present disclosure may include a plurality of first portions 11*a* which are apart from one another in a first direction X and a second direction Y and a second portion 11*b* which surrounds each of the plurality of first portions 11*a*.

Each of the plurality of first portions 11*a* may have a planar structure having a triangular shape. For example, each of the plurality of first portions 11*a* may have a triangular plate shape. The first portion 11*a* may include substantially the same piezoelectric material as that of the first portion 11*a* described above with reference to FIG. 5A, and thus, like reference numerals refer to like elements and their repeated descriptions are omitted.

According to an embodiment of the present disclosure, four adjacent first portions 11*a* of the plurality of first portions 11*a* may be disposed adjacent to one another to form a tetragonal shape (or a square shape). A vertex of each of four adjacent first portions 11*a* forming a tetragonal shape may be disposed adjacent to a middle portion (or a center portion) of a tetragonal shape.

The second portion 11*b* may be disposed between the plurality of first portions 11*a* in each of the first direction X and the second direction Y. The second portion 11*b* may be configured to surround each of the plurality of first portions 11*a*, and thus, may be connected to or attached on a lateral surface of each of the plurality of first portions 11*a*. The plurality of first portions 11*a* and the second portion 11*b* may be disposed (or arranged) in parallel on the same plane (or the same layer). The second portion 11*b* may include substantially the same piezoelectric material as that of the second portion 11*b* described above with reference to FIG. 5A, and thus, like reference numerals refer to like elements and their repeated descriptions are omitted.

According to another embodiment of the present disclosure, 2N (where N is a natural number of 2 or more) adjacent first portions 11*a* of a plurality of first portions 11*a* having a triangular shape may be arranged adjacent to one another to form a 2N-angular shape. For example, six adjacent first portions 11*a* of the plurality of first portions 11*a* may be disposed adjacent to one another to form a hexagonal shape (or a regular hexagon). A vertex of each of six adjacent first portions 11*a* forming a hexagonal shape may be disposed adjacent to a middle portion (or a center portion) of a hexagonal shape. The second portion 11*b* may be configured to surround each of the plurality of first portions 11*a*, and thus, may be connected to or attached on a lateral surface of each of the plurality of first portions 11*a*.

Figure 6:
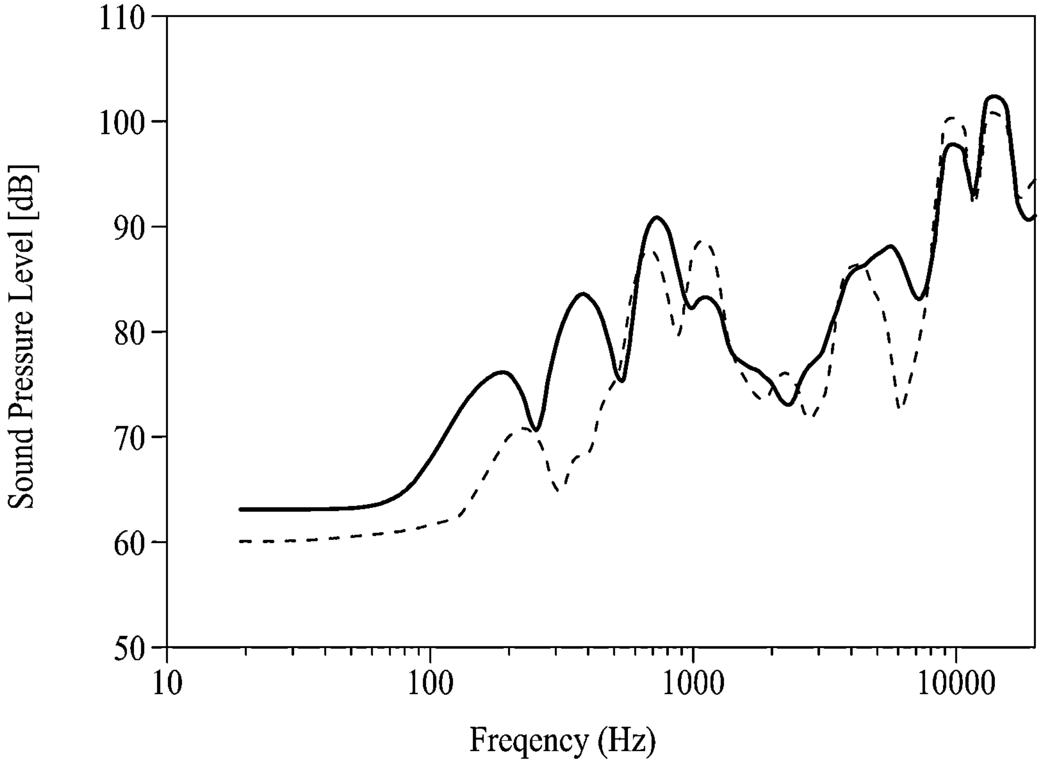
FIG. 6 illustrates sound output characteristics of an experiment example and a vibration apparatus according to an embodiment of the present disclosure illustrated in FIG. 2.

FIG. 6 illustrates sound output characteristics of an experiment example and a vibration apparatus according to an embodiment of the present disclosure illustrated in FIG. 2. In FIG. 6, the abscissa axis represents a frequency (Hz (hertz)), and the ordinate axis represents a sound pressure level SPL (dB (decibel)).

A sound output characteristic may be measured by a sound analysis apparatus. The sound analysis apparatus may be APX525 audio measurement equipment. The sound analysis apparatus may include a sound card which transmits or receives a sound to or from a control personal computer (PC), an amplifier which amplifies a signal generated from the sound card and transfers the amplified signal to a vibration apparatus, and a microphone which collects a sound generated by the vibration apparatus in a display panel. For example, the microphone may be disposed at a center of the vibration apparatus, and a distance between the display panel and the microphone may be about 30 cm. A sound may be measured in a state where the microphone is vertical to the vibration apparatus. The sound collected by the microphone may be input to the control PC through the sound card, and the sound of the vibration apparatus may be analyzed through checking in a control program. For example, a frequency response characteristic of a frequency range of 200 Hz to 20 kHz may be measured by using a pulse program. In sine sweep of 20 Hz to 20 kHz, measurement has been performed by applying ⅓ octave smoothing.

In FIG. 6, a thick solid line represents a sound output characteristic when the vibration apparatus illustrated in FIG. 2 is driven with a constant voltage where a traveling direction of polarization (or poling) meets a constant voltage (+), and a dotted line relates to an experiment example and represents a sound output characteristic when a vibration apparatus, where a plurality of vibration portions are arranged in parallel in a horizontal direction, is driven with a constant voltage.

As seen in FIG. 6, it may be seen that an average sound pressure level in 150 Hz to 8 kHz is about 80.65 dB in the thick solid line and is about 76.83 dB in the dotted line. Also, it may be seen that an average sound pressure level in 150 Hz to 20 kHz is about 83.55 dB in the thick solid line and is about 80.56 dB in the dotted line.

Therefore, in a vibration apparatus, it may be seen that a sound pressure level characteristic is enhanced more in a case, which is configured to be stacked in a vertical direction, than a case which is disposed in parallel in a horizontal direction.

Figure 7:
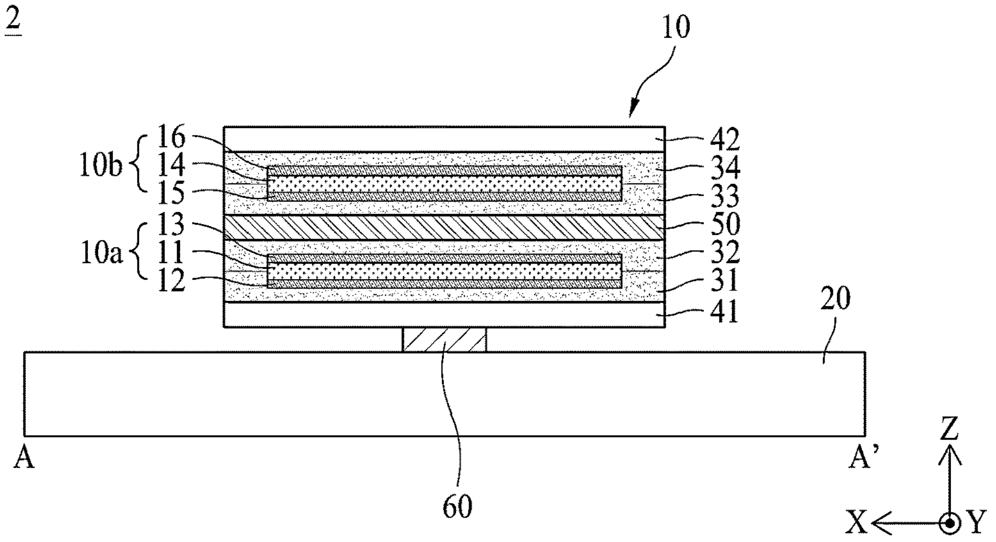
FIG. 7 is a cross-sectional view illustrating a vibration apparatus according to another embodiment of the present disclosure.
Figure 8:
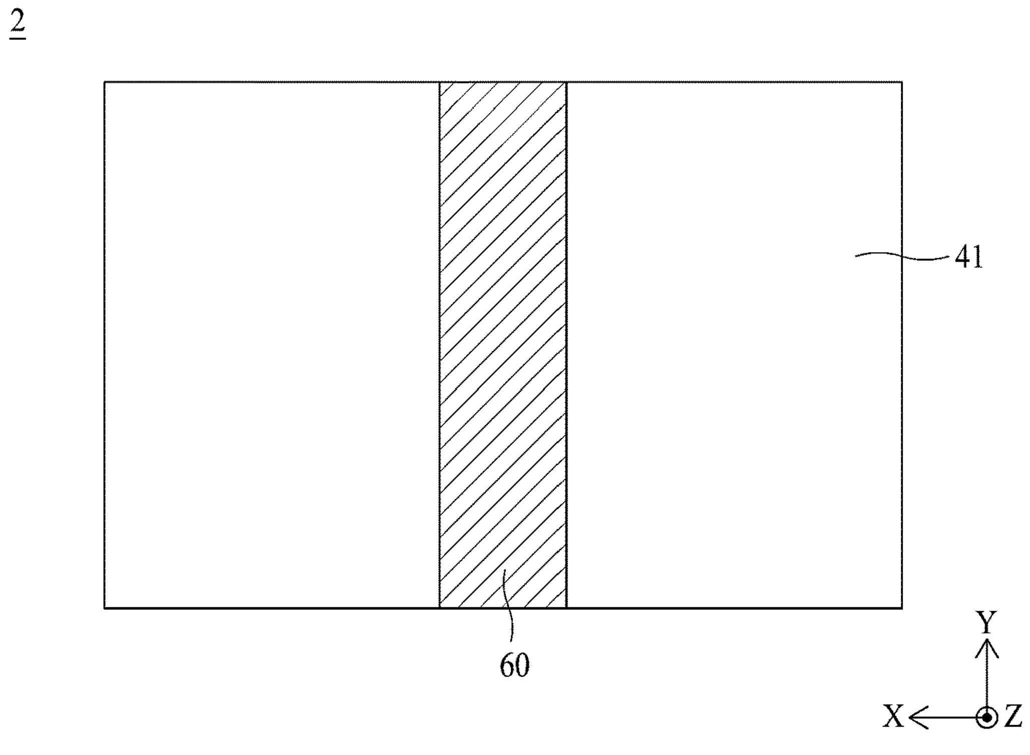
FIG. 8 illustrates a rear surface of the vibration apparatus illustrated in FIG. 7.
Figure 9A:
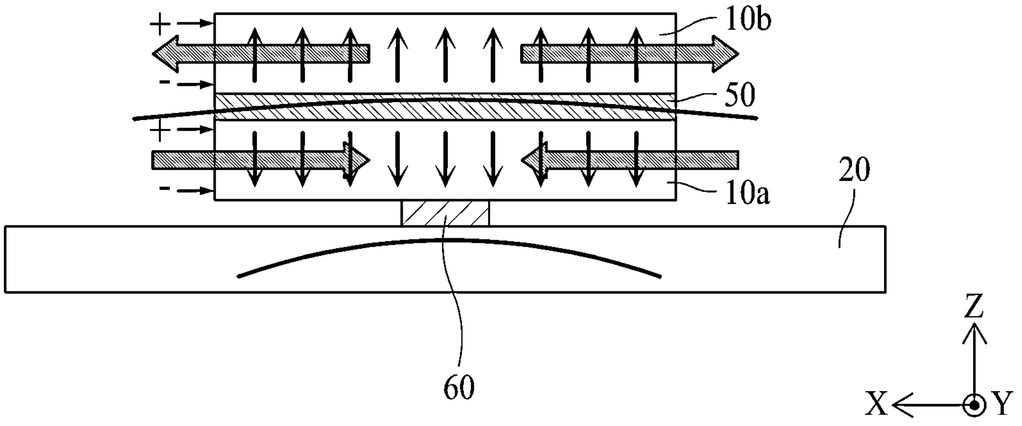
FIGS. 9A and 9B illustrate a displacement of a vibration apparatus according to another embodiment of the present disclosure.
Figure 9B:
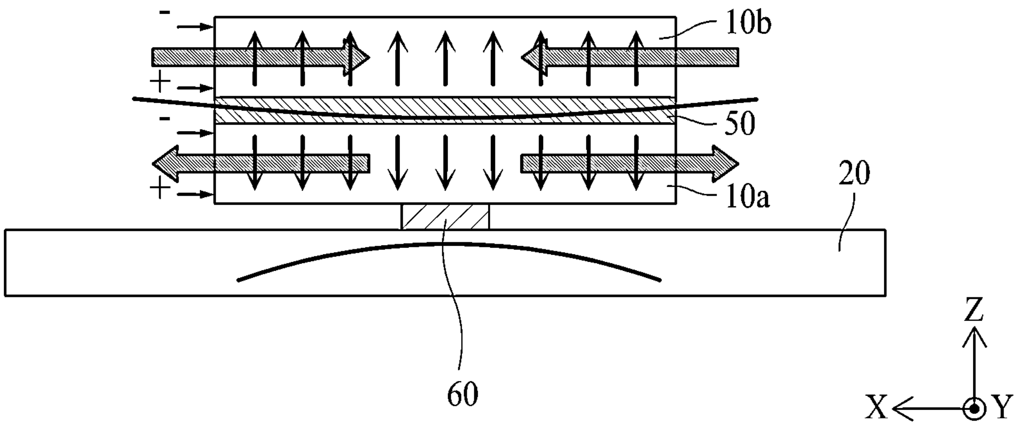

FIG. 7 is a cross-sectional view illustrating a vibration apparatus 2 according to another embodiment of the present disclosure, FIG. 8 illustrates a rear surface of the vibration apparatus illustrated in FIG. 7, and FIGS. 9A and 9B illustrate a displacement of a vibration apparatus according to another embodiment of the present disclosure. The drawings illustrate an embodiment implemented by modifying the vibration apparatus described above with reference to FIGS. 1 and 2. In the following description, therefore, the other elements except a vibration apparatus and relevant elements are referred to by like reference numerals, and their repeated descriptions are omitted or will be briefly given.

Referring to FIGS. 7 and 8, the vibration apparatus 2 according to another embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film piezoelectric speaker, or a film type piezoelectric composite speaker, but the terms are not limited thereto.

The vibration apparatus 2 according to another embodiment of the present disclosure may include a vibration member 20 and a vibration portion 10. For example, the vibration member 20 may be a vibration object, a display panel, a vibration plate, or a front member, but embodiments of the present disclosure are not limited thereto.

The vibration portion 10 of the vibration apparatus 2 according to another embodiment of the present disclosure may include a plurality of vibration generating portions 10*a* and 10*b*.

The plurality of vibration generating portions 10*a* and 10*b* may overlap or may be stacked to be displaced (or driven or vibrated) in the same direction. For example, the plurality of vibration generating portions 10*a* and 10*b* may have substantially the same size, but embodiments of the present disclosure are not limited thereto.

For example, the plurality of vibration generating portions 10*a* and 10*b* may have substantially the same size within an error range of a manufacturing process, but embodiments of the present disclosure are not limited thereto. Therefore, the plurality of vibration generating portions 10*a* and 10*b* may maximize an amplitude displacement of the vibration portion 10 and/or an amplitude displacement of the vibration member 20. One side (an end portion, an end, an outer surface, or each corner portion) of each of the plurality of vibration generating portions 10*a* and 10*b* may be aligned in a virtual extension line extending in a thickness direction Z, or may be disposed in the virtual extension line.

The vibration portion 10 according to an embodiment of the present disclosure may include two or more vibration generating portions 10*a* and 10*b* which are stacked to be displaced (or vibrated or driven) in the same direction. In the following description, an example where the vibration portion 10 includes first and second vibration generating portions 10*a* and 10*b* will be described.

According to an embodiment of the present disclosure, the vibration portion 10 may be connected to or disposed on the vibration member 20 by a connection member 60. For example, the first vibration generating portion 10*a* may be connected to or disposed on the vibration member 20 by the connection member 60.

As illustrated in FIG. 8, the connection member 60 may be disposed between at least a portion of the vibration portion 10 and the vibration member 20. The connection member 60 may be connected between at least a portion of the vibration portion 10 and the vibration member 20. The connection member 60 may be configured to extend in a vertical direction (or a Y-axis direction) and to have a certain width in a horizontal direction (an X-axis direction).

The connection member 60 according to another embodiment of the present disclosure may be connected between the vibration member 20 and a center portion of the vibration portion 10 except an edge portion (or a periphery portion) of the vibration portion 10. For example, the connection member 60 may be connected between the vibration member 20 and the center portion of the vibration portion 10 based on a partial attachment scheme. The center portion of the vibration portion 10 may be a portion which is a center of a vibration, and thus, a vibration of the vibration portion 10 may be efficiently transferred to the vibration member 20 through the connection member 60. The edge portion (or the periphery portion) of the vibration portion 10 may not be connected to the connection member 60 and/or the vibration member 20 and may be lifted apart from each of the connection member 60 and the vibration member 20, and thus, when a flexural vibration (or a bending vibration) of the vibration portion 10 is performed, a vibration of the edge portion (or the periphery portion) of the vibration portion 10 may be prevented (or reduced) by the connection member 60 and/or the vibration member 20, and thus, a vibration amplitude (or a displacement amplitude) of the vibration portion 10 may increase. Accordingly, a vibration amplitude (or a displacement amplitude) of the vibration member 20 based on a vibration of the vibration portion 10 may increase, and thus, a sound characteristic and a sound pressure level characteristic of a low-pitched sound band generated based on a vibration of the vibration member 20 may be more enhanced.

The first and second vibration generating portions 10*a* and 10*b* according to another embodiment of the present disclosure may include a first cover member 41 and a second cover member 42. A middle member 50 may be provided between the first and second vibration generating portions 10*a* and 10*b*.

The first cover member 41 may be disposed on the first vibration generating portion 10*a*. The first cover member 41 may be disposed on a first surface of the first vibration generating portion 10*a*. The second cover member 42 may be disposed on the second vibration generating portion 10*b*. The second cover member 42 may be disposed on a second surface of the second vibration generating portion 10*b*. The middle member 50 may be disposed between a second surface of the first vibration generating portion 10*a* and a first surface of the second vibration generating portion 10*b*.

The first vibration generating portion 10*a* may include a vibration layer 11, a first electrode layer 12, and a second electrode layer 13. The second vibration generating portion 10*b* may include a vibration layer 14, a first electrode layer 15, and a second electrode layer 16.

The vibration layers 11 and 14 of the first and second vibration generating portions 10*a* and 10*b* may include a piezoelectric material (or an electro active material) having a piezoelectric effect. For example, the piezoelectric material may have a characteristic where pressure or twisting is applied to a crystalline structure by an external force, a potential difference occurs due to dielectric polarization (or dielectric poling) caused by a relative position change of a positive (+) ion and a negative (−) ion, and a vibration is generated by an electric field based on a voltage applied thereto. The vibration layer 11 may include a ceramic-based material for implementing a relatively high vibration, or may include a piezoelectric ceramic having a perovskite-based crystalline structure. For example, the vibration layer 11 may be referred to as the terms such as a vibration layer, a piezoelectric layer, a piezoelectric material layer, an electro active layer, a vibration portion, a piezoelectric material portion, an electro active portion, a piezoelectric structure, a piezoelectric composite layer, a piezoelectric composite, or a piezoelectric ceramic composite, but the terms are not limited thereto.

Vibration layers 11 and 14 according to another embodiment of the present disclosure may include a plurality of first portions 11*a* and a plurality of second portions 11*b*. For example, the plurality of first portions 11*a* and the plurality of second portions 11*b* may be alternately and repeatedly arranged in a first direction X (or a second direction Y). For example, the first direction X may be a widthwise direction of the vibration layers 11 and 14 and the second direction Y may be a lengthwise direction of the vibration layers 11 and 14 intersecting with the first direction X, but embodiments of the present disclosure are not limited thereto. For example, the first direction X may be the lengthwise direction of the vibration layers 11 and 14, and the second direction Y may be the widthwise direction of the vibration layers 11 and 14.

Each of the plurality of first portions 11*a* may include an inorganic material portion. The inorganic material portion may include a piezoelectric material, a composite piezoelectric material, or an electro active material having a piezoelectric effect. For example, each of the plurality of first portions 11*a* may include substantially the same piezoelectric material as that of the vibration layer 11 described above with reference to FIGS. 1 and 2, and thus, like reference numerals refer to like elements and their repeated descriptions are omitted.

Each of the plurality of first portions 11*a* according to another embodiment of the present disclosure may be disposed between the plurality of second portions 11*b*. The plurality of second portions 11*b* may be disposed (or arranged) in parallel with the plurality of first portions 11*a* therebetween. Each of the plurality of first portions 11*a* may have a first width W1 parallel to the first direction X (or the second direction Y) and may have a length parallel to the second direction Y (or the first direction X). Each of the plurality of second portions 11*b* may have a second width W2 parallel to the first direction X (or the second direction Y) and may have a length parallel to the second direction Y (or the first direction X).

According to another embodiment of the present disclosure, the first width W1 may be the same as or different from the second width W2. For example, the first width W1 may be greater than the second width W2. The plurality of second portions 11*b* may have the same size, and for example, may have a width, an area, or a volume. For example, each of the plurality of second portions 11*b* may have the same size (for example, a width, an area, or a volume) within a process error (or an allowable error) occurring in a manufacturing process. For example, the first portion 11*a* and the second portion 11*b* may include a line shape or a stripe shape having the same size or different sizes.

Accordingly, the vibration layers 11 and 14 may have a 2-2 composite structure, and thus, may have a resonance frequency of 20 kHz or less, but embodiments of the present disclosure are not limited thereto. For example, the resonance frequency of the vibration layers 11 and 14 may vary based on one or more of a shape, a length, and a thickness thereof.

According to another embodiment of the present disclosure, the plurality of first portions 11*a* and the plurality of second portions 11*b* may be disposed (or arranged) in parallel on the same plane (or the same layer). The plurality of first portions 11*a* and the plurality of second portions 11*b* may be disposed (or arranged) in parallel on the same plane (or the same layer) and may be connected or coupled to one another.

Each of the plurality of second portions 11*b* may be configured to fill a gap between two adjacent first portions 11*a*. Each of the plurality of second portions 11*b* may be connected to or attached on an adjacent first portion 11*a*. Each of the plurality of second portions 11*b* may be configured to fill a gap between two adjacent first portions 11*a*, and thus, may be connected to or attached on an adjacent first portion 11*a*. Accordingly, the vibration layers 11 and 14 may extend by a desired size or length based on lateral coupling (or connection) of the first portion 11*a* and the second portion 11*b*.

According to another embodiment of the present disclosure, the width W2 of each of the plurality of second portions 11*b* may decrease progressively in a direction from a center portion of the vibration layers 11 and 14 or the vibration apparatus 2 to both edge portions (or both ends or both peripheries portions) thereof.

According to another embodiment of the present disclosure, when the vibration layers 11 and 14 or the vibration apparatus 2 vibrates in a vertical direction Z (or a thickness direction), a second portion 11*b* having a largest width W2 among the plurality of second portions 11*b* may be disposed at a portion on which a largest stress concentrates. When the vibration layers 11 and 14 or the vibration apparatus 2 vibrates in the vertical direction Z, a second portion 11*b* having a smallest width W2 among the plurality of second portions 11*b* may be disposed at a portion where a relatively smallest stress occurs. For example, the second portion 11*b* having the largest width W2 among the plurality of second portions 11*b* may be disposed at a center portion of the vibration layers 11 and 14, and the second portion 11*b* having the smallest width W2 among the plurality of second portions 11*b* may be disposed at both edge portions (or both peripheries portions) of the vibration layers 11 and 14. Accordingly, when the vibration layers 11 and 14 or the vibration apparatus 2 vibrates in the vertical direction Z, an overlap of a resonance frequency or interference of a sound wave occurring at a portion on which a largest stress concentrates may be minimized, and thus, dipping of a sound pressure level occurring in the low-pitched sound band may be reduced and the flatness of a sound characteristic in the low-pitched sound band may be improved.

According to another embodiment of the present disclosure, the plurality of first portions 11*a* may have different sizes (or widths). For example, a size (or a width) of each of the plurality of first portions 11*a* may decrease or increase progressively in a direction from the center portion of the vibration layers 11 and 14 or the vibration apparatus 2 to both edge portions (or both ends or both peripheries portions) thereof. In this case, a sound pressure level characteristic of a sound of the vibration layers 11 and 14 may be enhanced by various unique vibration frequencies based on vibrations of the plurality of first portions 11*a* having different sizes, and a reproduction band of a sound may extend.

Each of the plurality of second portions 11*b* may be disposed between the plurality of first portions 11*a*. Therefore, in the vibration layers 11 and 14 or the vibration apparatus 2, vibration energy based on a link in a unit lattice of the first portion 11*a* may be increased by the second portion 11*b*, and thus, a vibration characteristic may increase and a piezoelectric characteristic and flexibility may be secured. For example, the second portion 11*b* may include one of an epoxy-based polymer, an acrylic-based polymer, and a silicone-based polymer, but embodiments of the present disclosure are not limited thereto.

Each of the plurality of second portions 11*b* according to another embodiment of the present disclosure may be configured with an organic material portion. For example, the organic material portion may be disposed between two adjacent inorganic material portions, and thus, may absorb an impact applied to the inorganic material portion (or the first portion) and may release a stress concentrating on the inorganic material portion, thereby enhancing the durability of the vibration layers 11 and 14 or the vibration apparatus 2 and realizing the flexibility of the vibration layers 11 and 14 or the vibration apparatus 2.

The second portion 11*b* according to another embodiment of the present disclosure may have a modulus and viscoelasticity that are lower than those of the first portion 11*a*, and thus, the second portion 11*b* may enhance the reliability of the first portion 11*a* vulnerable to an impact due to a fragile characteristic of the first portion 11*a*. For example, the second portion 11*b* may include a material having a loss coefficient of about 0.01 to about 1 and a modulus of about 0.1 GPa (GigaPascal) to about 10 GPa (GigaPascal).

The organic material portion included in the second portion 11*b* may include an organic material, an organic polymer, an organic piezoelectric material, or an organic non-piezoelectric material having a flexible characteristic compared to the inorganic material portion which is the first portion 11*a*. For example, the second portion 11*b* may be referred to as an adhesive portion, a flexible portion, a bending portion, a damping portion, or a ductile portion, or the like, but embodiments of the present disclosure are not limited thereto.

The plurality of first portions 11*a* and the plurality of second portions 11*b* may be disposed on (or connected to) the same plane, and thus, the vibration layers 11 and 14 according to another embodiment of the present embodiment may have a single thin film form. For example, the vibration layers 11 and 14 may have a structure where the plurality of first portions 11*a* are connected to one side thereof. For example, the vibration layers 11 and 14 may have a structure where the plurality of first portions 11*a* are connected in all of the vibration layers 11 and 14. For example, the vibration layers 11 and 14 may be vibrated in a vertical direction by the first portion 11*a* having a vibration characteristic and may be bent in a curved shape by the second portion 11*b* having flexibility.

In the vibration layers 11 and 14 according to another embodiment of the present embodiment, a size of the first portion 11*a* and a size of the second portion 11*b* may be set based on a piezoelectric characteristic and flexibility needed for the vibration layers 11 and 14 or the vibration apparatus 2. For example, in the vibration layers 11 and 14 requiring a piezoelectric characteristic rather than flexibility, a size of the first portion 11*a* may be set to be greater than that of the second portion 11*b*. In another embodiment of the present disclosure, in the vibration layers 11 and 14 requiring flexibility rather than a piezoelectric characteristic, a size of the second portion 11*b* may be set to be greater than that of the first portion 11*a*. Accordingly, a size of the vibration layers 11 and 14 may be adjusted based on a desired characteristic, and thus, the vibration layers 11 and 14 may be easily designed.

The vibration layers 11 and 14 of the first and second vibration generating portions 10*a* and 10*b* may be polarized (or poling) in different or opposite directions. For example, the vibration layer 11 of the first vibration generating portion 10*a* may be configured so that a polarization direction (or a poling direction) faces a downward direction with respect to the thickness direction Z of the vibration member 20. The vibration layer 14 of the second vibration generating portion 10*b* may be configured so that a polarization direction (or a poling direction) faces an upward direction with respect to the thickness direction Z of the vibration member 20. The first and second vibration generating portions 10*a* and 10*b* may be stacked with the middle member 50 therebetween and may have different or opposite polarization directions (or different or opposite poling directions), and thus, may vibrate the vibration member 20 based on a vibration $d_{31}$ in different horizontal directions. For example, the middle member 50 may be disposed between the second surface of the first vibration generating portion 10*a* and the first surface of the second vibration generating portion 10*b*. For example, the middle member 50 may guide a vibration displacement of each of the first and second vibration generating portions 10*a* and 10*b* which are displaced in opposite directions between the first and second vibration generating portions 10*a* and 10*b*. For example, the middle member 50 may include a material having stiffness to guide vibration displacements in different or opposite directions. For example, the middle member 50 may include an epoxy material or a metal material where a modulus (or young's modulus) is several or more GPa (GigaPascal).

For example, the middle member 50 may include a metal material such as aluminum (Al), copper (Cu), stainless (SUS), iridium (Ir), tungsten (W), molybdenum (Mo), nitride aluminum (AlN), or oxide tantalum (TaOx) or may include a material including an alloy thereof, but embodiments of the present disclosure are not limited thereto. Alternatively, the middle member 50 may include one or more of an epoxy-based polymer, an acrylic-based polymer, and a silicone-based polymer, but embodiments of the present disclosure are not limited thereto.

For example, the vibration layer 11 of the first vibration generating portion 10*a* and the vibration layer 14 of the second vibration generating portion 10*b* may be displaced (or vibrated or driven) with the middle member 50 therebetween to prevent a vertical-direction vibration $d_{33}$, but as a horizontal-direction vibration $d_{31}$ overlaps oppositely, the vibration member 20 may vibrate based on the horizontal-direction vibration $d_{31}$. The vibration layers 11 and 14 may oppositely contract and expand in the horizontal direction to increase a displacement of a vibration member (or a vibration plate or a vibration object), thereby more enhancing a vibration characteristic.

The first electrode layers 12 and 15 of the first and second vibration generating portions 10*a* and 10*b* may be disposed on first surfaces (or lower surfaces) of the vibration layers 11 and 14. The first electrode layers 12 and 15 may be disposed on or coupled to a first surface of each of the plurality of first portions 11*a* and a first surface of each of the plurality of second portions 11*b* in common and may be electrically connected to the first surface of each of the plurality of first portions 11*a*. For example, the first electrode layers 12 and 15 may have a single electrode (or a common electrode) form disposed on the whole first surfaces of the vibration layers 11 and 14. For example, the first electrode layers 12 and 15 may have substantially the same shape as the vibration layers 11 and 14, but embodiments of the present disclosure are not limited thereto.

The second electrode layers 13 and 16 of the first and second vibration generating portions 10*a* and 10*b* may be disposed on second surfaces, which differ from (or opposite to) the first surfaces, of the vibration layers 11 and 14. The second electrode layers 13 and 16 may be disposed on or coupled to a second surface of each of the plurality of first portions 11*a* and a second surface of each of the plurality of second portions 11*b* in common and may be electrically connected to the second surface of each of the plurality of first portions 11*a*. For example, the second electrode layers 13 and 16 may have a single electrode (or a common electrode) form disposed on the whole second surface of the vibration layers 11 and 14. For example, the second electrode layers 13 and 16 may have substantially the same shape as the vibration layers 11 and 14, but embodiments of the present disclosure are not limited thereto.

The first electrode layers 12 and 15 and the second electrode layers 13 and 16 according to an embodiment may include the same material as that of each of the first electrode layers 12 and 15 and the second electrode layers 13 and 16 described above with reference to FIGS. 1 and 2, and thus, their repeated descriptions are omitted.

In the first vibration generating portion 10*a*, the first cover member 41 may be disposed on the first electrode layer 12. The first cover member 41 may protect the first electrode layer 12. For example, the first cover member 41 may include a plastic material, a fiber material, or a wood material, but embodiments of the present disclosure are not limited thereto.

In the second vibration generating portion 10*b*, the second cover member 42 may be disposed on the second electrode layer 16. The second cover member 42 may protect the second electrode layer 16. For example, the second cover member 42 may include a plastic material, a fiber material, or a wood material, but embodiments of the present disclosure are not limited thereto.

The first cover member 41 and the second cover member 42 respectively included in the first and second vibration generating portions 10*a* and 10*b* may include the same material or different materials. Each of the first cover member 41 and the second cover member 42 may be a polyimide film or a polyethylene terephthalate film, but embodiments of the present disclosure are not limited thereto.

Each of the first and second vibration generating portions 10*a* and 10*b* may include at least one first adhesive layer 31, second adhesive layer 32, third adhesive layer 33, and fourth adhesive layer 34.

In the first vibration generating portion 10*a*, the first adhesive layer 31 may be disposed between the first electrode layer 12 and the first cover member 41. For example, the first adhesive layer 31 may be disposed between the first cover member 41 and the first electrode layer 12 on the vibration layer 11.

In the first vibration generating portion 10*a*, the second adhesive layer 32 may be disposed between the vibration layer 11 and the middle member 50. For example, the second adhesive layer 32 may be disposed between the middle member 50 and the second electrode layer 13 on the vibration layer 11. The middle member 50 may be disposed on the first vibration generating portion 10*a* by the second adhesive layer 32. For example, the middle member 50 may be coupled or connected to a second surface (or the second electrode layer 13) of the first vibration generating portion 10*a* by a laminating process using the second adhesive layer 32.

In the first vibration generating portion 10*a*, the first and second adhesive layers 31 and 32 may be connected or coupled to each other between the first cover member 41 and the middle member 50. For example, in the first vibration generating portion 10*a*, the first and second adhesive layers 31 and 32 may be connected or coupled to each other at an edge portion (or a periphery portion) between the first cover member 41 and the middle member 50. Accordingly, in the first vibration generating portion 10*a*, the vibration layer 11 may be surrounded by the first and second adhesive layers 31 and 32. For example, the first and second adhesive layers 31 and 32 may fully surround all of the first vibration generating portion 10*a*.

In the second vibration generating portion 10*b*, the third adhesive layer 33 may be disposed between the vibration layer 14 and the middle member 50. For example, the third adhesive layer 33 may be disposed between the middle member 50 and the first electrode layer 15 on the vibration layer 14. The middle member 50 may be disposed on a first surface (or the first electrode layer 15) of the second vibration generating portion 10*b* by the third adhesive layer 33. For example, the middle member 50 may be coupled or connected to a first surface (or the first electrode layer 15) of the second vibration generating portion 10*b* by a laminating process using the third adhesive layer 33.

In the second vibration generating portion 10*b*, the fourth adhesive layer 34 may be disposed between the vibration layer 14 and the second cover member 42. For example, the fourth adhesive layer 34 may be disposed between the second cover member 42 and the second electrode layer 16 on the vibration layer 14. The second cover member 42 may be disposed on the second vibration generating portion 10*b* by the fourth adhesive layer 34. For example, the second cover member 42 may be coupled or connected to a second surface (or the second electrode layer 16) of the second vibration generating portion 10*b* by a laminating process using the fourth adhesive layer 34.

In the second vibration generating portion 10*b*, the third and fourth adhesive layers 33 and 34 may be connected or coupled to each other between the second cover member 42 and the middle member 50. For example, in the second vibration generating portion 10*b*, the third and fourth adhesive layers 33 and 34 may be connected or coupled to each other at an edge portion (or a periphery portion) between the second cover member 42 and the middle member 50. Accordingly, in the second vibration generating portion 10*b*, the vibration layer 14 may be surrounded by the third and fourth adhesive layers 33 and 34. For example, the third and fourth adhesive layers 33 and 34 may fully surround all of the second vibration generating portion 10*b*.

In each of the first and second vibration generating portions 10*a* and 10*b*, each of the first, second, third, and fourth adhesive layers 31 to 34 may include an electrical insulation material. For example, each of the first, second, third, and fourth adhesive layers 31 to 34 may include an electrical insulation material which has adhesive properties and is capable of compression and decompression. For example, one or more of the first, second, third, and fourth adhesive layers 31 to 34 may include epoxy resin, acryl resin, silicone resin, or urethane resin, but embodiments of the present disclosure are not limited thereto.

Referring to FIGS. 9A and 9B, the vibration layers 11 and 14 of the first and second vibration generating portions 10*a* and 10*b* according to another embodiment of the present disclosure may be polarized (or poling) in the different or opposite direction (or different or opposite poling direction). For example, the vibration layer 11 of the first vibration generating portion 10*a* may be configured so that a polarization direction (or a poling direction) faces a downward direction with respect to the thickness direction Z of the vibration member 20. The vibration layer 14 of the second vibration generating portion 10*b* may be configured so that a polarization direction (or a poling direction) faces an upward direction with respect to the thickness direction Z of the vibration member 20.

Moreover, as illustrated in FIG. 9A, an inverse voltage (−) (or a negative voltage) may be applied to the first electrode layers 12 and 15 of the first and second vibration generating portions 10*a* and 10*b*, and a constant voltage (+) (or a positive voltage) may be applied to the second electrode layers 13 and 16 of the first and second vibration generating portions 10*a* and 10*b*. The vibration layer 11 of the first vibration generating portion 10*a* may be configured so that a polarization direction (or a poling direction) faces a downward direction with respect to the thickness direction Z of the vibration member 20. Alternatively, the vibration layer 14 of the second vibration generating portion 10*b* may be configured so that a polarization direction faces an upward direction with respect to the thickness direction Z of the vibration member 20. Therefore, in the first vibration generating portion 10*a*, a polarization traveling direction (or a poling traveling direction) may meet the inverse voltage (−), and thus, the first vibration generating portion 10*a* may be deformed to contract from an outer side on a plane. On the other hand, in the second vibration generating portion 10*b*, a polarization traveling direction (or a poling traveling direction) may meet the constant voltage (+), and thus, the second vibration generating portion 10*b* may be deformed to extend to the outer side on the plane.

The first vibration generating portion 10*a* and the second vibration generating portion 10*b* may be oppositely driven in the horizontal-direction $d_{31}$, and thus, a vibration of the vibration member 20 may be largely applied to a region based on a vibration direction thereof.

As illustrated in FIG. 9B, a constant voltage (+) (or a positive voltage) may be applied to the first electrode layers 12 and 15 of the first and second vibration generating portions 10*a* and 10*b*, and an inverse voltage (−) (or a negative voltage) may be applied to the second electrode layers 13 and 16 of the first and second vibration generating portions 10*a* and 10*b*. The vibration layer 11 of the first vibration generating portion 10*a* may be configured so that a polarization direction (or a poling direction) faces a downward direction with respect to the thickness direction Z of the vibration member 20. Alternatively, the vibration layer 14 of the second vibration generating portion 10*b* may be configured so that a polarization direction (or a poling direction) faces an upward direction with respect to the thickness direction Z of the vibration member 20. Therefore, in the first vibration generating portion 10*a*, a polarization traveling direction (or a poling traveling direction) may meet the constant voltage (+), and thus, the first vibration generating portion 10*a* may be deformed to extend to the outer side on the plane. On the other hand, in the second vibration generating portion 10*b*, a polarization traveling direction (or a poling traveling direction) may meet the inverse voltage (−), and thus, the second vibration generating portion 10*b* may be deformed to contract from the outer side on the plane.

Figure 10:
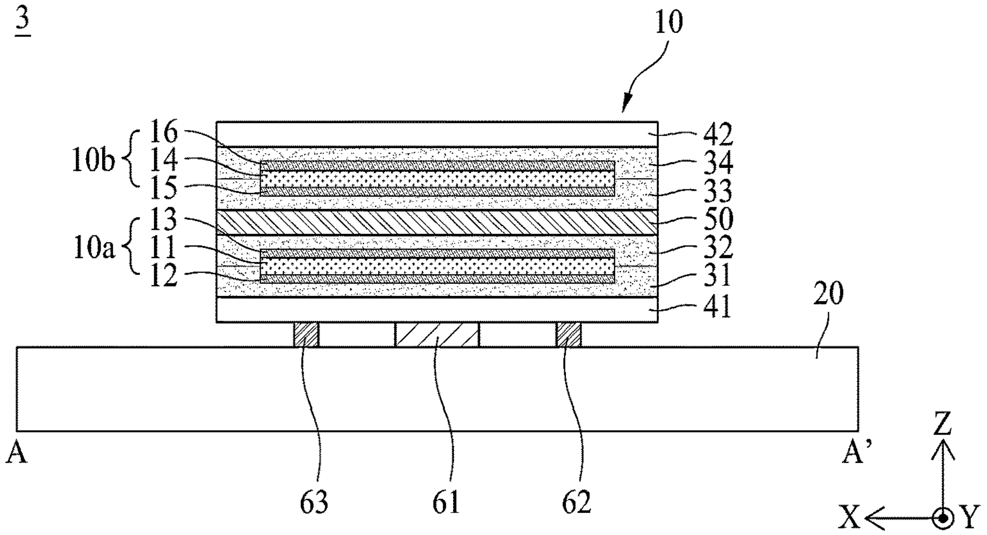
FIG. 10 is a cross-sectional view illustrating a vibration apparatus according to another embodiment of the present disclosure.
Figure 11:
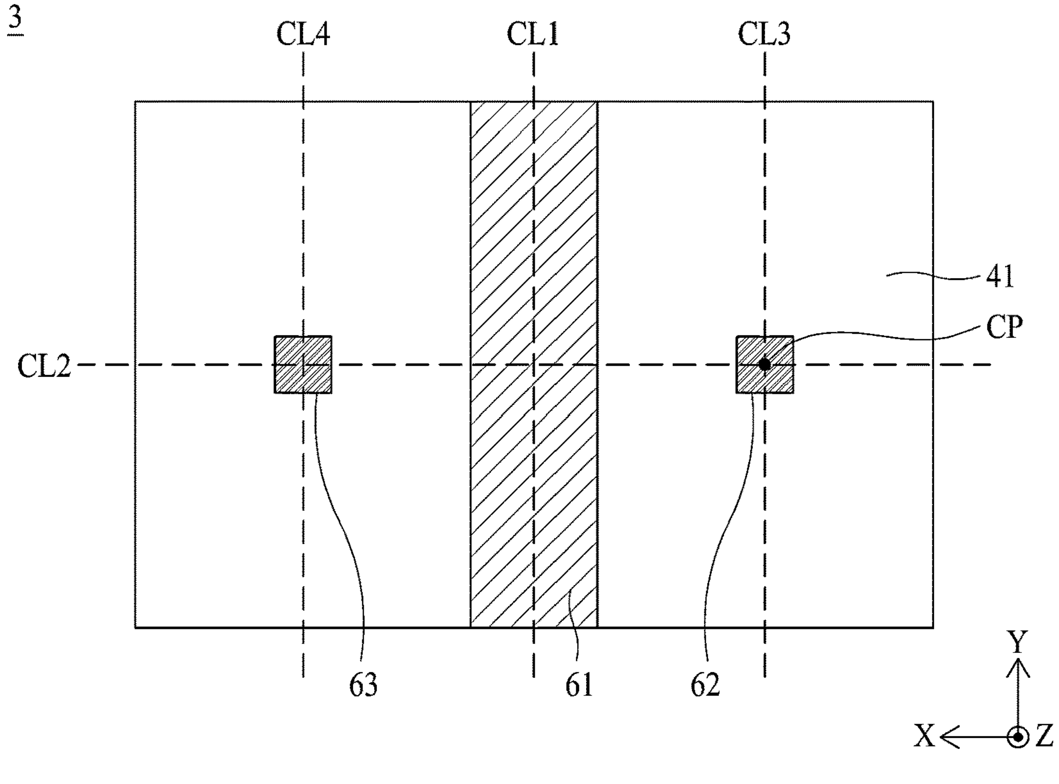
FIG. 11 illustrates a rear surface of the vibration apparatus illustrated in FIG. 10.
Figure 12A:
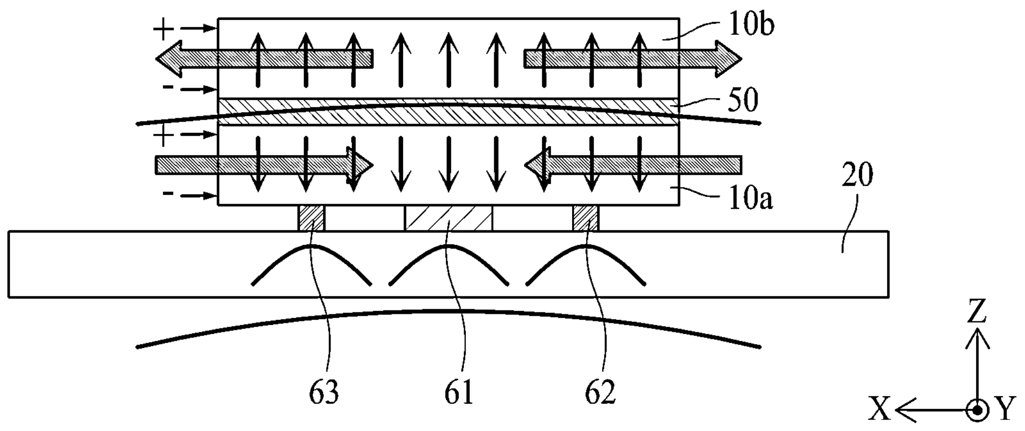
FIGS. 12A and 12B illustrate a displacement of a vibration apparatus according to another embodiment of the present disclosure.
Figure 12B:
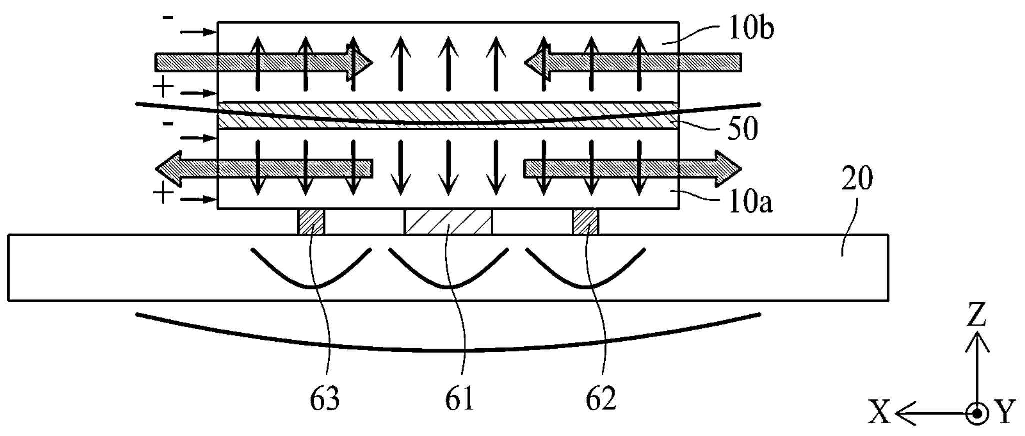

FIG. 10 is a cross-sectional view illustrating a vibration apparatus according to another embodiment of the present disclosure, FIG. 11 illustrates a rear surface of the vibration apparatus illustrated in FIG. 10, and FIGS. 12A and 12B illustrate a displacement of a vibration apparatus according to another embodiment of the present disclosure. The drawings illustrate an embodiment implemented by modifying the vibration apparatus described above with reference to FIGS. 7 and 8. In the following description, therefore, the other elements except a vibration apparatus and relevant elements are referred to by like reference numerals, and their repeated descriptions are omitted or will be briefly given.

The vibration apparatus 3 according to another embodiment of the present disclosure may include a vibration member 20 and a vibration portion 10. For example, the vibration member 20 may be a vibration object, a display panel, a vibration plate, or a front member, but embodiments of the present disclosure are not limited thereto.

The vibration portion 10 of the vibration apparatus 3 according to another embodiment of the present disclosure may include a plurality of vibration generating portions 10*a* and 10*b*.

The plurality of vibration generating portions 10*a* and 10*b* may overlap or may be stacked to be displaced (or driven or vibrated) in the same direction. For example, the plurality of vibration generating portions 10*a* and 10*b* may have substantially the same size, but embodiments of the present disclosure are not limited thereto.

According to an embodiment of the present disclosure, the vibration portion 10 may be connected to or disposed on the vibration member 20 by the first connection member 61, the second connection member 62, and the third connection member 63. For example, the first vibration generating portion 10*a* may be connected to or disposed on the vibration member 20 by the first connection member 61, the second connection member 62, and the third connection member 63.

As illustrated in FIG. 11, the first connection member 61, the second connection member 62, and the third connection member 63 may be disposed between the vibration member 20 and at least a portion of the vibration portion 10. The first connection member 61, the second connection member 62, and the third connection member 63 may be connected between the vibration member 20 and at least a portion of the vibration portion 10.

According to another embodiment of the present disclosure, the first connection member 61 may be configured to extend along a first center line CL1 of the vibration portion 10 and to have a certain width in a horizontal direction (an X-axis direction).

According to another embodiment of the present disclosure, the second connection member 62 may be disposed between a right end of the vibration portion 10 and the first connection member 61 in the horizontal direction (the X-axis direction) of the vibration portion 10. A center portion (or a middle portion) CP of the second connection member 62 may be disposed at a portion where a second center line CL2 of the vibration portion 10 in a vertical direction (a Y-axis direction) intersects with a third center line CL3 between the first connection member 61 and a right end of the vibration portion 10.

According to another embodiment of the present disclosure, the third connection member 63 may be disposed between a left end of the vibration portion 10 and the first connection member 61 in the horizontal direction (the X-axis direction) of the vibration portion 10. A center portion (or a middle portion) CP of the third connection member 63 may be disposed at a portion where a second center line CL2 of the vibration portion 10 in the vertical direction (the Y-axis direction) intersects with a fourth center line CL4 between the first connection member 61 and a left end of the vibration portion 10.

According to another embodiment of the present disclosure, the second connection member 62 and the third connection member 63 may have the same size, and for example, may have a width, an area, or a volume.

According to another embodiment of the present disclosure, the first to third connection members 61 to 63 may include different materials and/or substances.

For example, the first connection member 61 may include a material including an adhesive layer which is good in adhesive force or attaching force. The first connection member 61 may include a material having a high modulus of several or more MPa. For example, the first connection member 61 may include a double-sided tape or an adhesive, but is not limited thereto. For example, the adhesive layer of the first connection member 61 may include epoxy, acryl, silicone, or urethane, but is not limited thereto. For example, the adhesive layer of the first connection member 61 may include an acryl-based material, having a characteristic where an adhesive force is relatively good and hardness is high, among acryl and urethane. Accordingly, a vibration of the vibration portion 10 may be well transferred to the vibration member 20.

For example, the second connection member 62 and the third connection member 63 may include a material including an adhesive layer which is good in elastic force. The second connection member 62 and the third connection member 63 may include a material having a low modulus of several or less MPa. For example, the second connection member 62 and the third connection member 63 may include a foam pad, a single-sided tape, a double-sided tape, a single-sided foam pad, a double-sided foam pad, a single-sided foam tape, a double-sided foam tape, or an adhesive, but is not limited thereto. For example, the second connection member 62 and the third connection member 63 may include a urethane foam or a polyurethane foam, which is low in hardness and is good in elastic force. Therefore, an edge portion (or a periphery portion) of the vibration portion 10 may be elastically supported by the second connection member 62 and the third connection member 63, and thus, when a flexural vibration (or a bending vibration) of the vibration portion 10 is performed, a vibration of the edge portion (or a periphery portion) of the vibration portion 10 may be prevented (or reduced) by the second and third connection members 62 and 63 and/or the vibration member 20, and thus, a vibration amplitude (or a displacement amplitude) of the vibration portion 10 may increase. Accordingly, a vibration amplitude (or a displacement amplitude) of the vibration member 20 based on a vibration of the vibration portion 10 may increase, and thus, a sound characteristic and a sound pressure level characteristic of a low-pitched sound band generated based on a vibration of the vibration member 20 may be more enhanced.

Referring to FIGS. 12A and 12B, the vibration layers 11 and 14 of the first and second vibration generating portions 10*a* and 10*b* may be polarized (or poling) in different or opposite directions. For example, the vibration layer 11 of the first vibration generating portion 10*a* may be configured so that a polarization direction (or a poling direction) faces a downward direction with respect to the thickness direction Z of the vibration member 20. The vibration layer 14 of the second vibration generating portion 10*b* may be configured so that a polarization direction (or a poling direction) faces an upward direction with respect to the thickness direction Z of the vibration member 20.

The vibration portion 10 according to another embodiment of the present disclosure may be connected or coupled to the vibration member 20 by the first connection member 61, the second connection member 62, and the third connection member 63.

Therefore, as illustrated in FIGS. 12A and 12B, when the first and second vibration generating portions 10*a* and 10*b* vibrate in opposite directions, a center thereof may be fixed by the first connection member 61 and an edge (or a periphery) thereof may be elastically supported by the second and third connection members 62 and 63, and thus, a vibration amplitude (or a displacement amplitude) of the vibration member 20 based on a vibration of the vibration portion 10 may increase, and thus, a sound characteristic and a sound pressure level characteristic of a low-pitched sound band generated based on a vibration of the vibration member 20 may be more enhanced.

Figure 13:
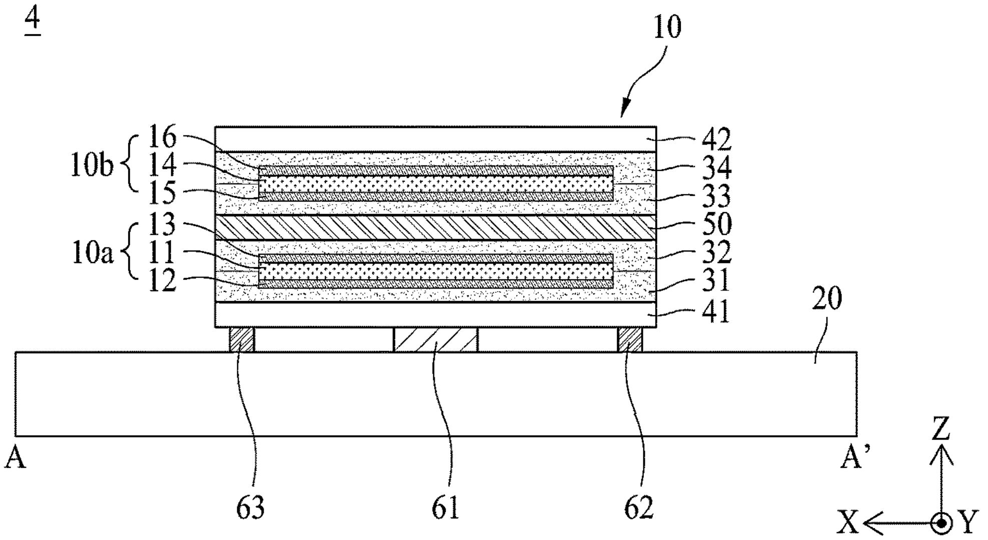
FIG. 13 is a cross-sectional view illustrating a vibration apparatus according to another embodiment of the present disclosure.
Figure 14:
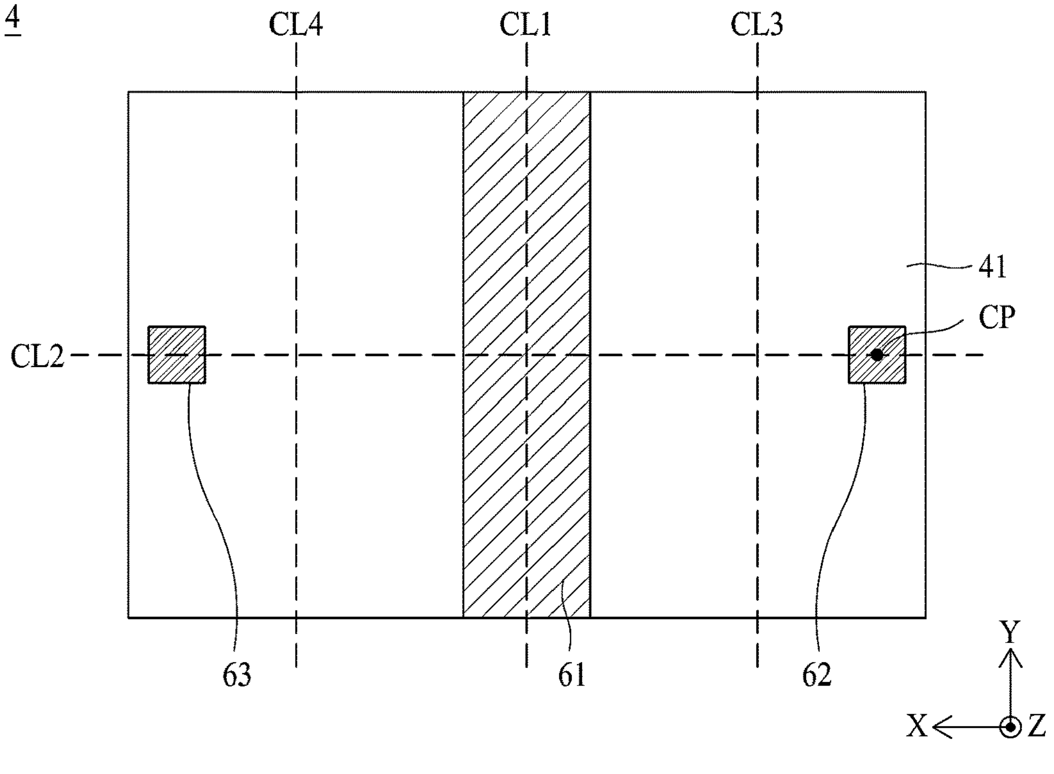
FIG. 14 illustrates a rear surface of the vibration apparatus illustrated in FIG. 13.

FIG. 13 is a cross-sectional view illustrating a vibration apparatus 4 according to another embodiment of the present disclosure, and FIG. 14 illustrates a rear surface of the vibration apparatus illustrated in FIG. 13. The drawings illustrate an embodiment implemented by modifying the vibration apparatus described above with reference to FIGS. 10 and 11. In the following description, therefore, the other elements except a vibration apparatus and relevant elements are referred to by like reference numerals, and their repeated descriptions are omitted or will be briefly given.

The vibration apparatus 4 according to another embodiment of the present disclosure may include a first connection member 61, a second connection member 62, and a third connection member 63 disposed between the vibration portion 10 and the vibration member 20.

As illustrated in FIG. 14, the first connection member 61, the second connection member 62, and the third connection member 63 may be disposed between the vibration member 20 and at least a portion of the vibration portion 10. The first connection member 61, the second connection member 62, and the third connection member 63 may be connected between the vibration member 20 and at least a portion of the vibration portion 10.

According to another embodiment of the present disclosure, the first connection member 61 may be configured to extend along a first center line CL1 of the vibration portion 10 and to have a certain width in a horizontal direction (an X-axis direction).

According to another embodiment of the present disclosure, the second connection member 62 may be disposed between a right end of the vibration portion 10 and the first connection member 61 in a horizontal direction (an X-axis direction) of the vibration portion 10. A center portion (or a middle portion) CP of the second connection member 62 may be disposed in a second center line CL2 of the vibration portion 10 in a vertical direction (a Y-axis direction). The center portion CP of the second connection member 62 may be disposed between a third center line CL3 and the right end of the vibration portion 10.

According to another embodiment of the present disclosure, the third connection member 63 may be disposed between a left end of the vibration portion 10 and the first connection member 61 in the horizontal direction (the X-axis direction) of the vibration portion 10. A center portion (or a middle portion) CP of the third connection member 63 may be disposed in a second center line CL2 of the vibration portion 10 in the vertical direction (the Y-axis direction). The center portion CP of the third connection member 63 may be disposed between a fourth center line CL4 and the left end of the vibration portion 10.

Figure 15:
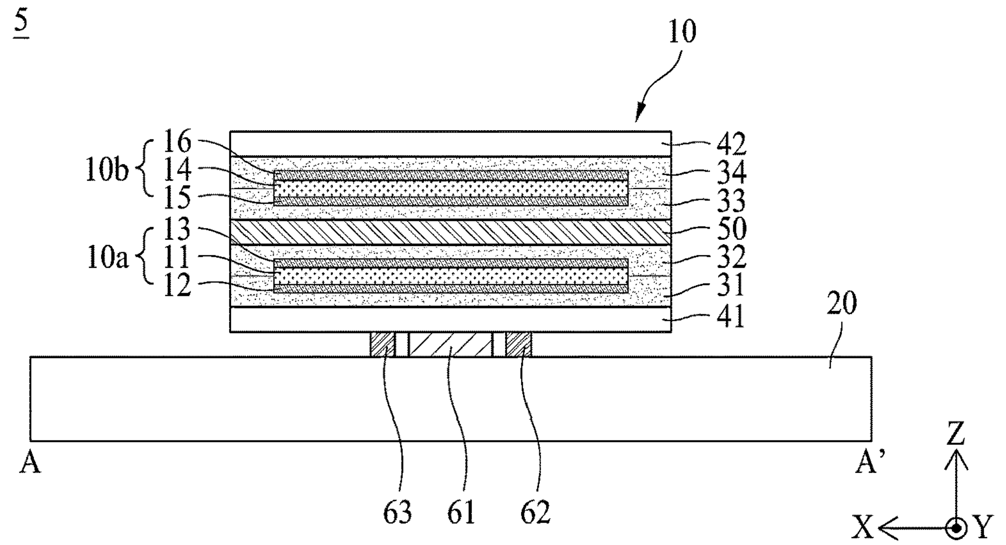
FIG. 15 is a cross-sectional view illustrating a vibration apparatus according to another embodiment of the present disclosure.
Figure 16:
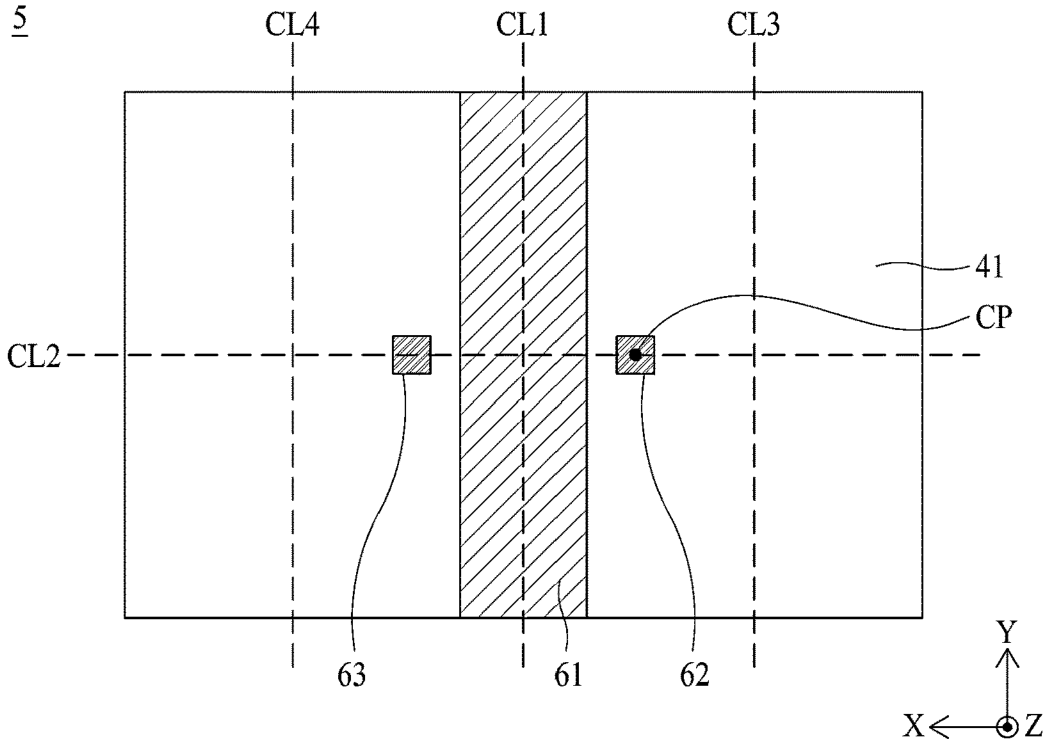
FIG. 16 illustrates a rear surface of the vibration apparatus illustrated in FIG. 15.

FIG. 15 is a cross-sectional view illustrating a vibration apparatus according to another embodiment of the present disclosure, and FIG. 16 illustrates a rear surface of the vibration apparatus illustrated in FIG. 15. The drawings illustrate an embodiment implemented by modifying the vibration apparatus described above with reference to FIGS. 10 and 11. In the following description, therefore, the other elements except a vibration apparatus and relevant elements are referred to by like reference numerals, and their repeated descriptions are omitted or will be briefly given.

The vibration apparatus 5 according to another embodiment of the present disclosure may include a first connection member 61, a second connection member 62, and a third connection member 63 disposed between the vibration portion 10 and the vibration member 20.

As illustrated in FIG. 16, the first connection member 61, the second connection member 62, and the third connection member 63 may be disposed between the vibration member 20 and at least a portion of the vibration portion 10. The first connection member 61, the second connection member 62, and the third connection member 63 may be connected between the vibration member 20 and at least a portion of the vibration portion 10.

According to another embodiment of the present disclosure, the first connection member 61 may be configured to extend along a first center line CL1 of the vibration portion 10 and to have a certain width in a horizontal direction (an X-axis direction).

According to another embodiment of the present disclosure, the second connection member 62 may be disposed between a right end of the vibration portion 10 and the first connection member 61 in a horizontal direction (an X-axis direction) of the vibration portion 10. A center portion (or a middle portion) CP of the second connection member 62 may be disposed in a second center line CL2 of the vibration portion 10 in a vertical direction (a Y-axis direction). The center portion CP of the second connection member 62 may be disposed between a third center line CL3 and the first connection member 61.

According to another embodiment of the present disclosure, the third connection member 63 may be disposed between a left end of the vibration portion 10 and the first connection member 61 in the horizontal direction (the X-axis direction) of the vibration portion 10. A center portion (or a middle portion) CP of the third connection member 63 may be disposed in a second center line CL2 of the vibration portion 10 in the vertical direction (the Y-axis direction). The center portion CP of the third connection member 63 may be disposed between a fourth center line CL4 and the first connection member 61.

Figure 17:
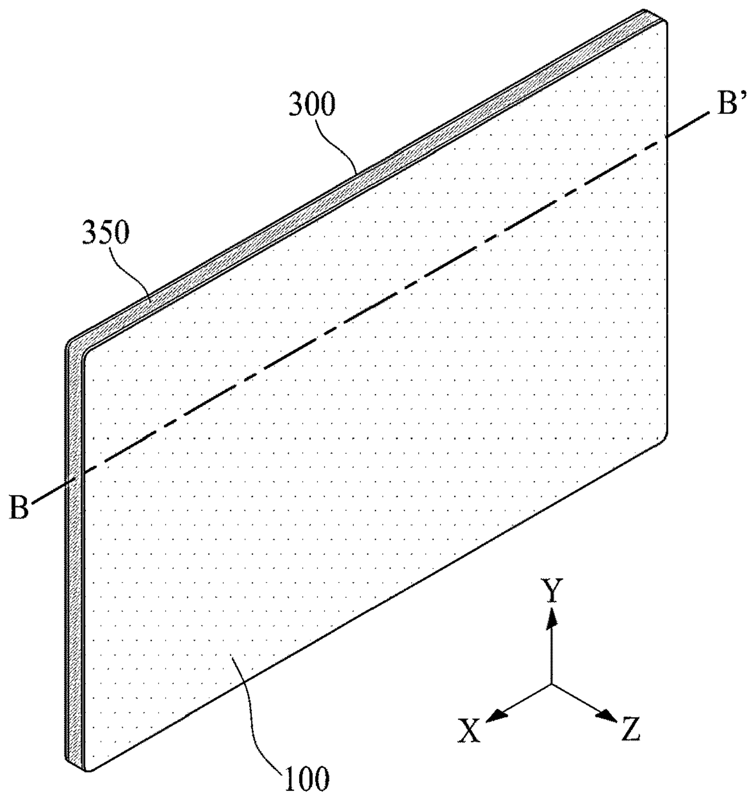
FIG. 17 illustrates an apparatus according to an embodiment of the present disclosure.
Figure 18:
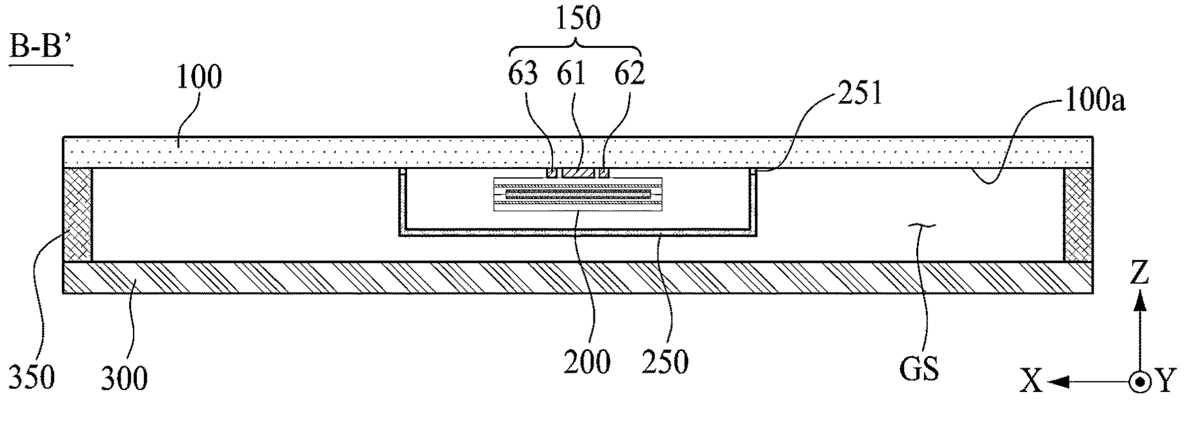
FIG. 18 is a cross-sectional view taken along line B-B' illustrated in FIG. 17.

FIG. 17 illustrates an apparatus according to an embodiment of the present disclosure, and FIG. 18 is a cross-sectional view taken along line B-B' illustrated in FIG. 17.

Referring to FIGS. 17 and 18, the apparatus according to an embodiment of the present disclosure may include a passive vibration member 100 and one or more vibration generating apparatuses 200.

An "apparatus" according to an embodiment of the present disclosure may be a display apparatus, a sound apparatus, a sound generating apparatus, a sound bar, an analog signage, or a digital signage, but embodiments of the present disclosure are not limited thereto.

A display apparatus may include a display panel, including a plurality of pixels implementing a white-and-black image or a color image, and a driver for driving the display panel. For example, the display panel may be a liquid crystal display panel, an organic light emitting display panel, a light emitting diode display panel, an electrophoretic display panel, an electro-wetting display panel, a micro light emitting diode display panel, or a quantum dot light emitting display panel, but embodiments of the present disclosure are not limited thereto. For example, in the organic light emitting display panel, a pixel may include an organic light emitting device such as an organic light emitting layer and may be a subpixel which implements one of a plurality of colors constituting a color image. Therefore, an "apparatus" according to an embodiment of the present disclosure may include a set electronic apparatus or a set device (or a set apparatus), such as a mobile electronic apparatus such as a smartphone or an electronic pad, and an equipment apparatus including a notebook computer, a television (TV), a computer monitor, an automotive apparatus, or a vehicle, which is a complete product (or a final product) including a display panel such as a liquid crystal display panel or an organic light emitting display panel.

The analog signage may be an advertising signboard, a poster, or a guideboard. The analog signage may include content such as a sentence, a picture, and a sign. The content may be disposed to be visible from the passive vibration member 100 of the apparatus. The content may be directly attached on the passive vibration member 100, and a medium such as paper on which content is attached through printing may be attached on the passive vibration member 100.

The passive vibration member 100 may vibrate based on driving (or vibration) of one or more vibration generating apparatuses 200. For example, the passive vibration member 100 may generate one or more of a vibration and a sound based on driving of the one or more vibration generating apparatuses 200.

The passive vibration member 100 according to an embodiment of the present disclosure may be a display panel which includes a display unit (or a screen) including a plurality of pixels implementing a white-and-black image or a color image. Therefore, the passive vibration member 100 may generate one or more of a vibration and a sound based on driving of the one or more vibration generating apparatuses 200. For example, the passive vibration member 100 may vibrate based on driving of the vibration generating apparatus 200 while displaying an image on the display unit, and thus, may generate or output a sound synchronized with an image in the display unit. For example, the passive vibration member 100 may be a vibration object, a display member, a display panel, a signage panel, a passive vibration plate, a front cover, a front member, a vibration panel, a sound panel, a passive vibration panel, a sound output plate, a sound vibration plate, or an image screen, but embodiments of the present disclosure are not limited thereto.

The passive vibration member 100 according to an embodiment of the present disclosure may be a vibration plate which includes a metal material having a material characteristic which is suitable for vibrating by the one or more vibration generating apparatuses 200 to output a sound, or includes a nonmetal material (or a complex nonmetal material). For example, the passive vibration member 100 may be a vibration plate including one or more materials of metal, plastic, paper, wood, rubber, fiber, cloth, leather, glass, and mirror. For example, paper may be a cone paper for speakers.

The passive vibration member 100 according to an embodiment of the present disclosure may include a display panel including a pixel displaying an image, or may include a non-display panel. For example, the passive vibration member 100 may include one or more of a display panel including a pixel displaying an image, a screen panel on which an image is projected from a display apparatus, a lighting panel, a signage panel, an interior material of a vehicular means, an exterior material of a vehicular means, a glass window of a vehicular means, a seat interior material of a vehicular means, a ceiling material of a building, an interior material of a building, a glass window of a building, an interior material of an aircraft, a glass window of an aircraft, and a mirror, but embodiments of the present disclosure are not limited thereto. For example, the non-display panel may include a light emitting diode lighting panel (or apparatus), an organic light emitting lighting panel (or apparatus), or an inorganic light emitting lighting panel (or apparatus), but embodiments of the present disclosure are not limited thereto.

The one or more vibration generating apparatuses 200 may be configured to vibrate the passive vibration member 100. The one or more vibration generating apparatuses 200 may be configured to be connected to a rear surface 100*a* of the passive vibration member 100 by the connection member 150. Accordingly, the one or more vibration generating apparatuses 200 may vibrate the passive vibration member 100, and thus, may generate or output one or more of a vibration and a sound based on a vibration of the passive vibration member 100.

The one or more vibration generating apparatuses 200 may include the vibration portion 10 in one or more of the vibration apparatuses 1 to 5 described above with reference to FIGS. 1 to 16. Therefore, descriptions of the vibration portion 10 in the vibration apparatuses 1 to 5 illustrated in FIGS. 1 to 16 may be included in a description of the vibration generating apparatus 200 illustrated in FIGS. 17 and 18, and thus, like reference numerals refer to like elements and repeated descriptions thereof are omitted.

The connection member 150 may be disposed between the passive vibration member 100 and at least a portion of the vibration generating apparatus 200. The connection member 150 may be connected between the passive vibration member 100 and at least a portion of the vibration generating apparatus 200. The connection member 150 according to an embodiment of the present disclosure may be connected between the passive vibration member 100 and a center portion of the vibration generating apparatus 200 except an edge portion (or a periphery portion) of the vibration generating apparatus 200. For example, the connection member 150 may be connected between the passive vibration member 100 and the center portion of the vibration generating apparatus 200 based on the partial attachment scheme. The center portion of the vibration generating apparatus 200 may be a portion which is a center of a vibration, and thus, a vibration of the vibration generating apparatus 200 may be efficiently transferred to the passive vibration member 100 through the connection member 150. The connection member 150 may be connected to or attached on a whole front surface of each of the one or more vibration generating apparatuses 200 and a rear surface 100*a* of the passive vibration member 100 based on a whole surface attachment scheme, but embodiments of the present disclosure are not limited thereto.

The connection member 150 according to an embodiment of the present disclosure may include a material including an adhesive layer which is good in adhesive force or attaching force, with respect to each of a rear surface of the passive vibration member 100 or a display panel and the one or more vibration generating apparatuses 200. For example, the connection member 150 may include a foam pad, a double-sided tape, or an adhesive, but is not limited thereto. For example, the adhesive layer of the connection member 150 may include epoxy, acryl, silicone, or urethane, but is not limited thereto. For example, the adhesive layer of the connection member 150 may include an acryl-based material, having a characteristic where an adhesive force is relatively good and hardness is high, among acryl and urethane. Accordingly, a vibration of each of the one or more vibration generating apparatuses 200 may be well transferred to the passive vibration member 100.

The apparatus according to an embodiment of the present disclosure may include a supporting member 300 and a coupling member 350.

The supporting member 300 may be disposed on the rear surface 100*a* of the passive vibration member 100. The supporting member 300 may be disposed on the rear surface 100*a* of the passive vibration member 100 to cover the vibration generating apparatus 200. The supporting member 300 may be disposed on the rear surface 100*a* of the passive vibration member 100 to cover all of the vibration generating apparatus 200 and the rear surface 100*a* of the passive vibration member 100. For example, the supporting member 300 may have the same size as that of the passive vibration member 100. For example, the supporting member 300 may cover the whole rear surface of the passive vibration member 100 with the vibration generating apparatus 200 and a gap space GS therebetween. The gap space GS may be provided by the coupling member 350 disposed between the passive vibration member 100 and the supporting member 300 facing each other. The gap space GS may be referred to as an air gap, an accommodating space, a vibration space, or a sound box, but embodiments of the present disclosure are not limited thereto.

The supporting member 300 may include one material of a glass material, a metal material, and a plastic material. The supporting member 300 may include a stack structure where one or more materials of a glass material, a metal material, and a plastic material are stacked.

Each of the passive vibration member 100 and the supporting member 300 may have a square shape or a rectangular shape, but is not limited thereto and may have a polygonal shape, a non-polygonal shape, a circular shape, or an oval shape. For example, when the apparatus according to an embodiment of the present disclosure is applied to a sound apparatus or a sound bar, each of the passive vibration member 100 and the supporting member 300 may have a rectangular shape where a long-side length is twice or more times a short-side length, but embodiments of the present disclosure are not limited thereto.

The coupling member 350 may be configured to be connected between a rear edge portion (or a rear periphery portion) of the passive vibration member 100 and a front edge portion (or a front periphery portion) of the supporting member 300, and thus, may provide the gap space GS between the passive vibration member 100 and the supporting member 300 facing each other.

The coupling member 350 according to an embodiment of the present disclosure may include an elastic material which has adhesive properties and is capable of compression and decompression. For example, the coupling member 350 may include a double-sided tape, a single-sided tape, or a double-sided adhesive foam pad, but is not limited thereto and may include an elastic pad such as a silicone pad or a rubber pad, which has adhesive properties and is capable of compression and decompression. For example, the coupling member 350 may be formed of an elastomer.

Alternatively, the supporting member 300 may further include a sidewall portion which supports a rear edge portion (or a rear periphery portion) of the passive vibration member 100. The sidewall portion of the supporting member 300 may protrude or may be bent toward the rear edge portion (or the rear periphery portion) of the passive vibration member 100 from a front edge portion (or a front periphery portion) of the supporting member 300, and thus, may provide the gap space GS between the passive vibration member 100 and the supporting member 300. In this case, the coupling member 350 may be configured to be connected between the sidewall portion of the supporting member 300 and the rear edge portion (or the rear periphery portion) of the passive vibration member 100. Accordingly, the supporting member 300 may cover the one or more vibration generating apparatuses 200 and may support the rear surface of the passive vibration member 100. For example, the supporting member 300 may cover the one or more vibration generating apparatuses 200 and may support the rear edge portion (or the rear periphery portion) of the passive vibration member 100.

Alternatively, the passive vibration member 100 may further include a sidewall portion which is connected to the front edge portion (or the front periphery portion) of the supporting member 300. The sidewall portion of the passive vibration member 100 may protrude or may be bent toward the front edge portion (or the front periphery portion) of the supporting member 300 from the rear edge portion (or the rear periphery portion) of the passive vibration member 100, and thus, may provide the gap space GS between the passive vibration member 100 and the supporting member 300. The stiffness of the passive vibration member 100 may increase based on the sidewall portion. In this case, the coupling member 350 may be configured to be connected between the sidewall portion of the passive vibration member 100 and the rear edge portion (or the rear periphery portion) of the supporting member 300. Accordingly, the supporting member 300 may cover the one or more vibration generating apparatuses 200 and may support the rear surface 100*a* of the passive vibration member 100. For example, the supporting member 300 may cover the one or more vibration generating apparatuses 200 and may support the rear edge portion (or the rear periphery portion) of the passive vibration member 100.

The apparatus according to an embodiment of the present disclosure may further include one or more enclosures 250.

The enclosure 250 may be connected or coupled to the rear edge portion (or the rear periphery portion) of the passive vibration member 100 to individually cover the one or more vibration generating apparatuses 200. For example, the enclosure 250 may be connected or coupled to the rear surface 100*a* of the passive vibration member 100 by a coupling member 251. The enclosure 250 may configure a sealed space, which covers or surrounds the one or more vibration generating apparatuses 200, in the rear surface 100*a* of the passive vibration member 100. For example, the enclosure 250 may be a sealed member, a sealed cap, a sealed box, or a sound box, but embodiments of the present disclosure are not limited thereto.

The enclosure 250 may include one or more materials of a metal material or a nonmetal material (or a complex nonmetal material). For example, the enclosure 250 may include one or more materials of a metal material, plastic, and wood, but embodiments of the present disclosure are not limited thereto.

The enclosure 250 according to an embodiment of the present disclosure may maintain a constant impedance component based on air acting on the passive vibration member 100 when the passive vibration member 100 or the vibration generating apparatus 200 is vibrating. For example, air near the passive vibration member 100 may resist a vibration of the passive vibration member 100 and may act as an impedance component having a reactance component and a resistance varying based on a frequency. Therefore, the enclosure 250 may configure a sealed space, surrounding the one or more vibration generating apparatuses 200, in the rear surface 100*a* of the passive vibration member 100, and thus, may maintain an impedance component (or an air impedance or an elastic impedance) acting on the passive vibration member 100 based on air, thereby enhancing a sound characteristic and/or a sound pressure level characteristic of a low-pitched sound band and enhancing the quality of a sound of a high-pitched sound band.

Figure 19:
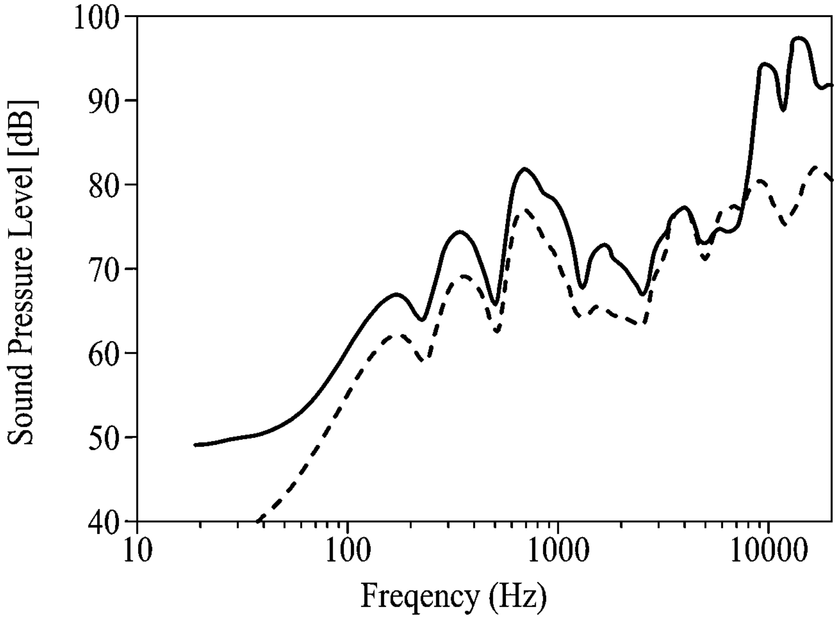
FIG. 19 illustrates a sound output characteristic of an experiment example compared with a vibration apparatus according to an embodiment of the present disclosure.

FIG. 19 illustrates a sound output characteristic of an experiment example compared with a vibration apparatus according to an embodiment of the present disclosure. In FIG. 19, the abscissa axis represents a frequency (Hz (hertz)), and the ordinate axis represents a sound pressure level SPL (dB (decibel)).

A sound output characteristic may be measured by a sound analysis apparatus. The sound analysis apparatus may be APX525 audio measurement equipment. The sound analysis apparatus may include a sound card which transmits or receives a sound to or from a control personal computer (PC), an amplifier which amplifies a signal generated from the sound card and transfers the amplified signal to a vibration apparatus, and a microphone which collects a sound generated by the vibration apparatus in a display panel. For example, the microphone may be disposed at a center of the vibration apparatus, and a distance between the display panel and the microphone may be about 30 cm. A sound may be measured in a state where the microphone is vertical to the vibration apparatus. The sound collected by the microphone may be input to the control PC through the sound card, and the sound of the vibration apparatus may be analyzed through checking in a control program. For example, a frequency response characteristic of a frequency range of 200 Hz to 20 kHz may be measured by using a pulse program. In sine sweep of 20 Hz to 20 kHz, measurement has been performed by applying ⅓ octave smoothing.

In FIG. 19, a thick solid line represents a sound output characteristic when a constant voltage is applied to a vibration apparatus where a connection member is changed based on whole surface attachment in the vibration apparatus illustrated in FIG. 7, and a dotted line represents a sound output characteristic when an inverse voltage is applied to a vibration apparatus of an experiment example.

As seen in FIG. 19, it may be seen that an average sound pressure level in 150 Hz to 8 kHz is about 72.68 dB in the thick solid line (constant voltage driving) and is about 68.8 dB in the dotted line (inverse voltage driving). Also, it may be seen that an average sound pressure level in 150 Hz to 20 kHz is about 76.46 dB in the thick solid line (constant voltage driving) and is about 70.75 dB in the dotted line (inverse voltage driving). Accordingly, in a vibration apparatus, when a connection member is disposed on a front surface, it may be seen that inverse voltage driving is difficult.

Figure 20:
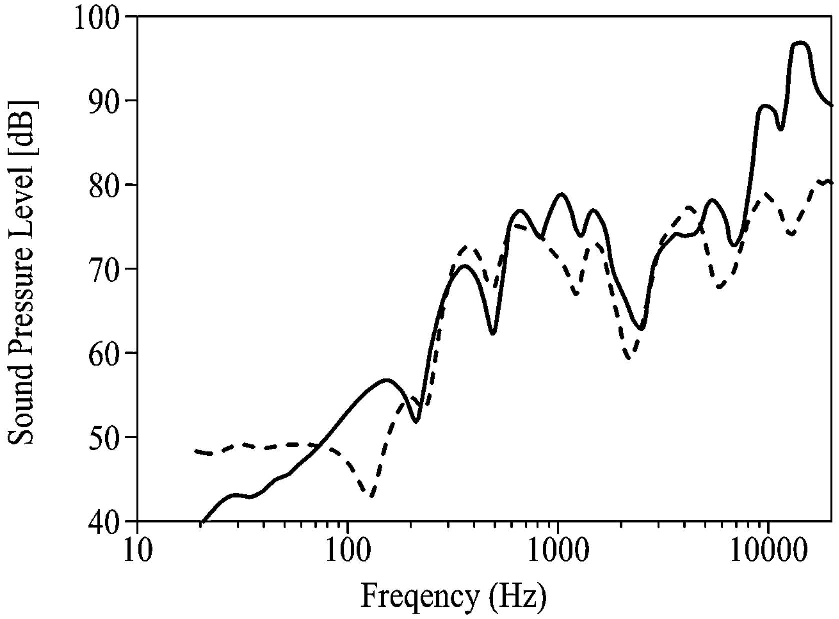
FIG. 20 illustrates a sound output characteristic of an experiment example compared with a vibration apparatus according to an embodiment of the present disclosure.

FIG. 20 illustrates a sound output characteristic of an experiment example compared with a vibration apparatus according to an embodiment of the present disclosure. In FIG. 20, the abscissa axis represents a frequency (Hz (hertz)), and the ordinate axis represents a sound pressure level SPL (dB (decibel)).

A method of measuring a sound output characteristic may be the same as details described above with reference to FIG. 19, and thus, a description thereof is omitted.

In FIG. 20, a thick solid line represents a sound output characteristic when a constant voltage is applied to a vibration apparatus where a connection member is changed based on half attachment of a center portion in the vibration apparatus illustrated in FIG. 7, and a dotted line represents a sound output characteristic when an inverse voltage is applied to a vibration apparatus of an experiment example.

As seen in FIG. 20, it may be seen that an average sound pressure level in 150 Hz to 8 kHz is about 70.01 dB in the thick solid line (constant voltage driving) and is about 68.2 dB in the dotted line (inverse voltage driving). Also, it may be seen that an average sound pressure level in 150 Hz to 20 kHz is about 73.91 dB in the thick solid line (constant voltage driving) and is about 70.02 dB in the dotted line (inverse voltage driving). Accordingly, in a vibration apparatus, when an area occupied by a connection member is large, it may be seen that inverse voltage driving is difficult.

Figure 21:
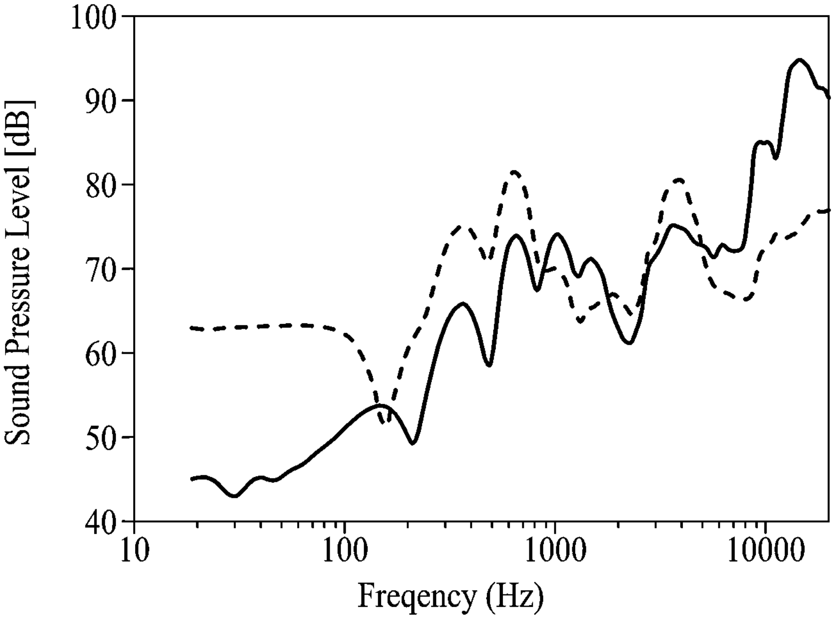
FIG. 21 illustrates a sound output characteristic of a vibration apparatus according to an embodiment of the present disclosure illustrated in FIG. 7.

FIG. 21 illustrates a sound output characteristic of a vibration apparatus according to an embodiment of the present disclosure illustrated in FIG. 7. In FIG. 21, the abscissa axis represents a frequency (Hz (hertz)), and the ordinate axis represents a sound pressure level SPL (dB (decibel)).

A method of measuring a sound output characteristic may be the same as details described above with reference to FIG. 19, and thus, a description thereof is omitted.

In FIG. 21, a thick solid line represents a sound output characteristic when a constant voltage is applied to the vibration apparatus illustrated in FIG. 7, and a dotted line represents a sound output characteristic when an inverse voltage is applied.

It may be seen that an average sound pressure level in 150 Hz to 8 kHz is about 66.65 dB in the thick solid line (constant voltage driving) and is about 69.77 dB in the dotted line (inverse voltage driving). Also, it may be seen that an average sound pressure level in 150 Hz to 20 kHz is about 70.77 dB in the thick solid line (constant voltage driving) and is about 70.55 dB in the dotted line (inverse voltage driving). Accordingly, in a vibration apparatus, when a connection member is partially disposed in a center region, it may be seen that inverse voltage driving is possible.

Figure 22:
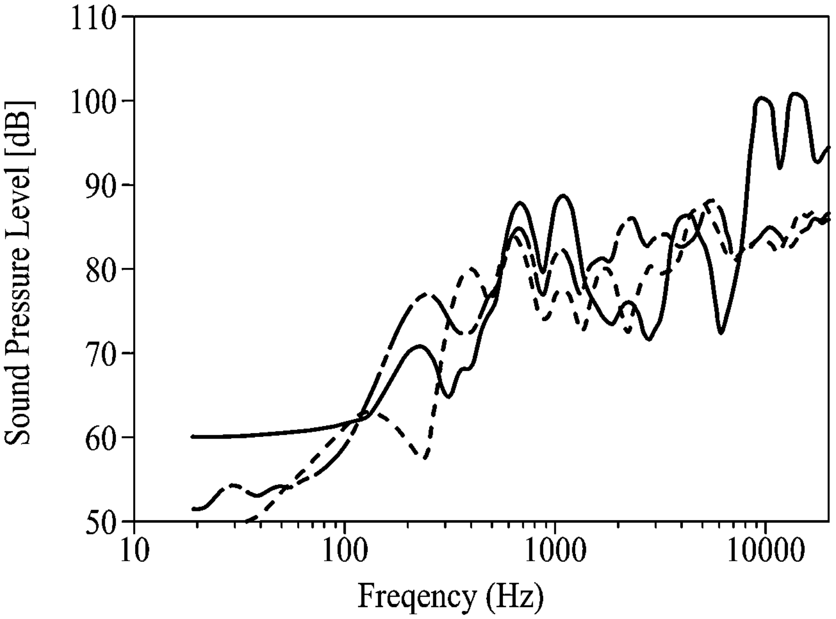
FIG. 22 illustrates sound output characteristics of an experiment example and vibration apparatuses according to an embodiment of the present disclosure illustrated in FIGS. 7 and 10.

FIG. 22 illustrates sound output characteristics of an experiment example and vibration apparatuses according to an embodiment of the present disclosure illustrated in FIGS. 7 and 10. In FIG. 22, the abscissa axis represents a frequency (Hz (hertz)), and the ordinate axis represents a sound pressure level SPL (dB (decibel)).

A method of measuring a sound output characteristic may be the same as details described above with reference to FIG. 19, and thus, a description thereof is omitted.

In FIG. 22, a thick solid line relates to an experiment example and represents a sound output characteristic when a constant voltage is applied to a vibration apparatus where a connection member is changed based on whole surface attachment in the vibration apparatus illustrated in FIG. 7, a dotted line represents a sound output characteristic when an inverse voltage is applied to the vibration apparatus illustrated in FIG. 7, and a one-dot-dashed line represents a sound output characteristic when an inverse voltage is applied to the vibration apparatus illustrated in FIG. 10.

In FIG. 22, it may be seen that an average sound pressure level in 150 Hz to 8 kHz is about 76.83 dB in the thick solid line (constant voltage driving), is about 76.16 dB in the dotted line (inverse voltage driving), and is about 79.91 dB in the one-dot-dashed line. Also, it may be seen that an average sound pressure level in 150 Hz to 20 kHz is about 80.56 dB in the thick solid line (constant voltage driving), is about 77.66 dB in the dotted line (inverse voltage driving), and is about 80.71 dB in the one-dot-dashed line. Accordingly, in the vibration apparatus illustrated in FIG. 10, it may be seen that a sound output characteristic is enhanced and flatness is improved.

Figure 23:
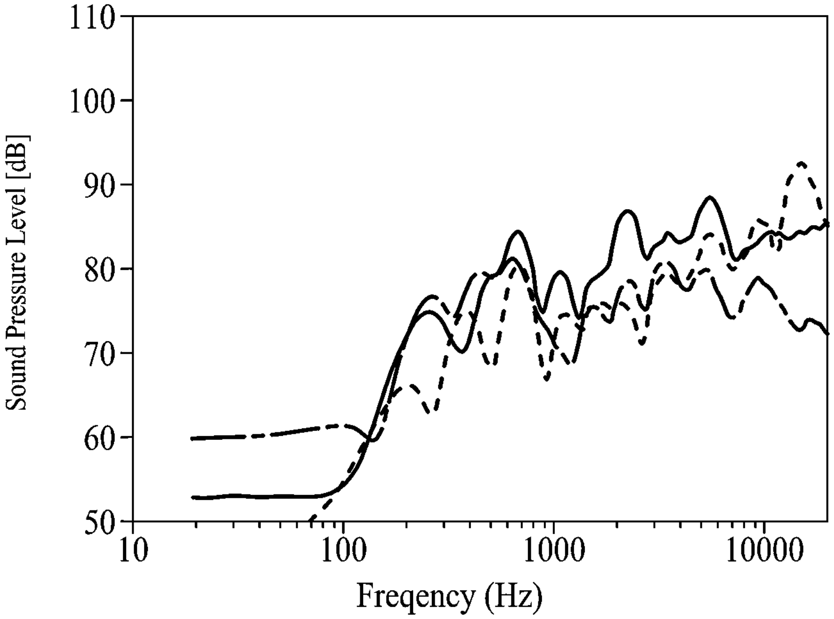
FIG. 23 illustrates sound output characteristics of experiment examples and the vibration apparatus according to an embodiment of the present disclosure illustrated in FIG. 10.

FIG. 23 illustrates sound output characteristics of experiment examples and the vibration apparatus according to an embodiment of the present disclosure illustrated in FIG. 10. In FIG. 23, the abscissa axis represents a frequency (Hz (hertz)), and the ordinate axis represents a sound pressure level SPL (dB (decibel)).

A method of measuring a sound output characteristic may be the same as details described above with reference to FIG. 19, and thus, a description thereof is omitted.

In FIG. 23, a thick solid line represents a sound output characteristic when an inverse voltage is applied to the vibration apparatus illustrated in FIG. 7, a one-dot-dashed line relates to an experiment example and represents a sound output characteristic when an inverse voltage is applied to an apparatus implemented by removing a center portion connection member from the vibration apparatus illustrated in FIG. 10, and a dotted line relates to an experiment example and represents a sound output characteristic when an inverse voltage is applied to a vibration apparatus implemented by replacing connection members with a hard double-sided tape in the vibration apparatus illustrated in FIG. 10.

In FIG. 23, it may be seen that an average sound pressure level in 150 Hz to 8 kHz is about 79.91 dB in the thick solid line, is about 73.95 dB in the dotted line, and is about 75.76 dB in the one-dot-dashed line. Also, it may be seen that an average sound pressure level in 150 Hz to 20 kHz is about 80.71 dB in the thick solid line, is about 76.38 dB in the dotted line, and is about 75.68 dB in the one-dot-dashed line. Accordingly, in a vibration apparatus where a connection member is configured as a hard double-sided tape, it may be seen that a sound output characteristic is reduced and flatness is reduced. In a vibration apparatus where a foam tape is provided at both ends (or both sides), it may be seen that a sound pressure level characteristic increases slightly in a band of 700 Hz or less.

Figure 24:
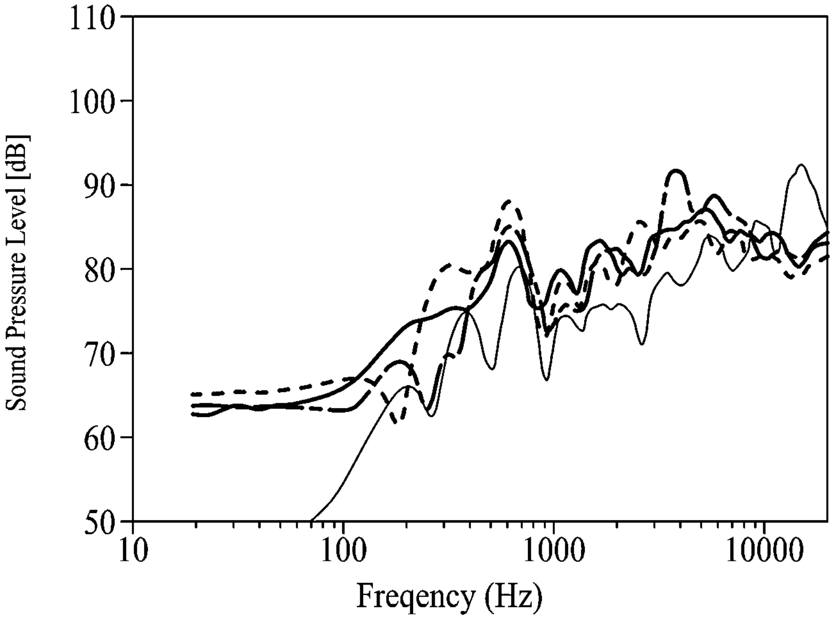
FIG. 24 illustrates sound output characteristics of an experiment example and vibration apparatuses according to an embodiment of the present disclosure illustrated in FIGS. 10, 13, and 15.

FIG. 24 illustrates sound output characteristics of an experiment example and vibration apparatuses according to an embodiment of the present disclosure illustrated in FIGS. 10, 13, and 15. In FIG. 24, the abscissa axis represents a frequency (Hz (hertz)), and the ordinate axis represents a sound pressure level SPL (dB (decibel)).

A method of measuring a sound output characteristic may be the same as details described above with reference to FIG. 19, and thus, a description thereof is omitted.

In FIG. 24, a thick solid line represents a sound output characteristic when an inverse voltage is applied to the vibration apparatus illustrated in FIG. 10, a dotted line represents a sound output characteristic when an inverse voltage is applied to the vibration apparatus illustrated in FIG. 13, a one-dot-dashed line represents a sound output characteristic when an inverse voltage is applied to the vibration apparatus illustrated in FIG. 15, and a solid line relates to an experiment example and represents a sound output characteristic when an inverse voltage is applied to a vibration apparatus implemented by replacing connection members with a hard double-sided tape in the vibration apparatus illustrated in FIG. 10.

In FIG. 24, it may be seen that an average sound pressure level in 150 Hz to 8 kHz is about 73.95 dB in the solid line, is about 79.73 dB in the thick solid line, is about 79.54 dB in the dotted line, and is about 78.74 dB in the one-dot-dashed line. Also, it may be seen that an average sound pressure level in 150 Hz to 20 kHz is about 76.38 dB in the solid line, is about 80.29 dB in the thick solid line, is about 79.76 dB in the dotted line, and is about 79.41 dB in the one-dot-dashed line.

Therefore, in the vibration apparatus of FIG. 10, it may be seen that a sound pressure level output characteristic increases totally and flatness is good. In the vibration apparatus of FIG. 13, it may be seen that a sound pressure level output characteristic increases in bands of 8 kHz or less, is good in sound band of 250 Hz to 800 Hz, and is maintained in a band of 200 Hz or less. In the vibration apparatus of FIG. 15, it may be seen that a sound pressure level output characteristic is improved in a band of 400 Hz or more.

An apparatus according to an embodiment of the present disclosure will be described below.

An apparatus according to an embodiment of the present disclosure may include a vibration member, a plurality of vibration generating portions overlapping one another, and a connection member connecting at least a portion of the plurality of vibration generating portions to the vibration member.

According to some embodiments of the present disclosure, each of the plurality of vibration generating portions may include a vibration layer including a piezoelectric material, a first electrode layer at a first surface of the vibration layer, and a second electrode layer at a surface different from the first surface of the vibration layer.

According to some embodiments of the present disclosure, the plurality of vibration generating portions may be configured to vibrate in the same direction.

According to some embodiments of the present disclosure, the connection member may be connected to the first electrode layer of a first vibration generating portion of the plurality of vibration generating portions.

According to some embodiments of the present disclosure, the connection member may be disposed between the first electrode layer of a first vibration generating portion of the plurality of vibration generating portions and the vibration member.

According to some embodiments of the present disclosure, each of the plurality of vibration generating portions may have a rectangular shape.

According to some embodiments of the present disclosure, a first vibration generating portion of the plurality of vibration generating portions may directly connect the vibration member by an adhesive layer.

According to some embodiments of the present disclosure, the apparatus may further include a protection member between two adjacent vibration portions of the plurality of vibration generating portions.

According to some embodiments of the present disclosure, the plurality of vibration generating portions may be configured to vibrate in different or opposite directions.

According to some embodiments of the present disclosure, the connection member may overlap a portion of a first vibration generating portion of the plurality of vibration generating portions.

According to some embodiments of the present disclosure, the apparatus may further include a middle member between two adjacent vibration generating portions of the plurality of vibration generating portions.

According to some embodiments of the present disclosure, the middle member may be stiffer than the plurality of vibration generating portions.

According to some embodiments of the present disclosure, the plurality of vibration generating portions may be configured to vibrate in different or opposite directions with the middle member therebetween.

According to some embodiments of the present disclosure, the plurality of vibration generating portions may be spaced apart from the vibration member with the connection member therebetween.

According to some embodiments of the present disclosure, the connection member may include a first connection member, and at least two additional connection members spaced apart from the first connection member.

According to some embodiments of the present disclosure, the at least two additional connection members may be spaced apart from an edge of the vibration portion defining an air gap between the additional connection members, the vibration portion and the vibration member.

According to some embodiments of the present disclosure, the at least two additional connection members may be spaced apart from the first connection member defining an air gap between the additional connection members, the first connection member, the vibration portion and the vibration member.

According to some embodiments of the present disclosure, the at least two additional connection members may be spaced apart from each other defining an air gap between adjacent additional connection members, the vibration portion and the vibration member.

According to some embodiments of the present disclosure, the at least two additional connection members may include a second connection member and a third connection member, and the second connection member and the third connection member may be symmetrical to each other with the first connection member therebetween.

According to some embodiments of the present disclosure, the first connection member may be stiffer than the at least two additional connection members.

According to some embodiments of the present disclosure, the at least two additional connection members may be more elastic than the first connection member.

According to some embodiments of the present disclosure, a second connection member of the at least two additional connection member at one side of the first connection member may be disposed between the first connection member and an end of the vibration portion.

According to some embodiments of the present disclosure, a second connection member of the at least two additional connection member at one side of the first connection member may be disposed adjacent to the first connection member.

According to some embodiments of the present disclosure, a second connection member of the at least two additional connection member at one side of the first connection member may be disposed adjacent to one side of the vibration portion.

According to some embodiments of the present disclosure, the vibration member may include one or more of metal, plastic, paper, fiber, cloth, wood, rubber, leather, glass, and mirror.

According to some embodiments of the present disclosure, the vibration member may include one or more of a display panel including a plurality of pixels configured to display an image, a screen panel on which an image is to be projected from a display apparatus, a light emitting diode lighting panel, an organic light emitting lighting panel, an inorganic light emitting lighting panel, a signage panel, an interior material of a vehicular means, an exterior material of a vehicular means, a glass window of a vehicular means, a seat interior material of a vehicular means, a ceiling material of a building, an interior material of a building, a glass window of a building, an interior material of an aircraft, a glass window of an aircraft, and a mirror.

An apparatus according to an embodiment of the present disclosure may include a vibration member, a plurality of vibration generating portions overlapping one another, each of the plurality of vibration generating portions including a vibration portion, and a connection member connecting at least a portion of the vibration portion to the vibration member, the vibration portion may include a vibration layer, and the vibration layer includes a plurality of first portions and a plurality of second portions including material different from the plurality of first portions.

According to some embodiments of the present disclosure, each of the plurality of first portions may include inorganic material having a piezoelectric effect, and each of the plurality of second portions includes organic material having a flexible characteristic compared to the inorganic material which is the first portion.

According to some embodiments of the present disclosure, the plurality of first portions and the plurality of second portions may be alternately and repeatedly arranged in a first direction.

According to some embodiments of the present disclosure, the width in the first direction of each of the plurality of first portions may decrease or increase progressively in a direction from the center portion of the vibration layer to both edge portions of the vibration layer.

According to some embodiments of the present disclosure, the width in the first direction of each of the plurality of second portions may decrease progressively in a direction from a center portion of the vibration layer to both edge portions of vibration layer.

According to some embodiments of the present disclosure, the plurality of first portions may be spaced apart from one another in a first direction and a second direction intersecting with the first direction, and the plurality of second portions are disposed between the plurality of first portions.

According to some embodiments of the present disclosure, a plurality of first portions may be spaced apart from one another in a first direction and a second direction intersecting with the first direction, and the plurality of second portions surround each of the plurality of first portions.

According to some embodiments of the present disclosure, each of the plurality of first portions may have a circular shape, an oval shape, a polygonal shape, or a donut shape.

According to some embodiments of the present disclosure, each of the plurality of first portions may have a triangular shape, and 2N adjacent first portions of the plurality of first portions having a triangular shape are arranged adjacent to one another to form a 2N-angular shape, where N is a natural number of 2 or more.

The vibration generating apparatus according to an embodiment of the present disclosure may be applied to a vibration generating apparatus provided in the apparatus. The apparatus according to an embodiment of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, televisions (TVs), wall paper display apparatuses, signage devices, game machines, notebook computers, monitors, cameras, camcorders, home appliances, etc. Also, the vibration generating apparatus according to some embodiments of the present disclosure may be applied to organic light emitting lighting devices or inorganic light emitting lighting devices. In a case where the vibration generating apparatus is applied to a lighting device, the vibration apparatus may act as lighting and a speaker. Also, in a case where the vibration generating apparatus according to some embodiments of the present disclosure is applied to a mobile device, the vibration apparatus may be one or more of a speaker, a receiver, or a haptic, but embodiments of the present disclosure are not limited thereto.

An apparatus according to embodiments of the present disclosure may vibrate a display panel to generate a sound and may output a sound having an enhanced sound pressure level characteristic in a forward direction of the display panel.

An apparatus according to embodiments of the present disclosure may enhance a middle-pitched sound band characteristic, a low-pitched sound band characteristic, and/or a middle-low-pitched sound band characteristic of a sound which is generated based on a displacement of the display panel as an amplitude displacement of the display panel increases and may improve the flatness of a sound.

A vibration apparatus according to embodiments of the present disclosure may enhance a middle-pitched sound band characteristic, a low-pitched sound band characteristic, and/or a middle-low-pitched sound band characteristic of a sound which is generated based on a displacement of a vibration plate and may improve the flatness of a sound.

It will be apparent to those skilled in the art that various modifications and variations can be made in the apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. An apparatus, comprising:

a vibration member;

a plurality of vibration generating portions configured to vibrate the vibration member in a vertical direction, the plurality of vibration generating portions overlapping one another in the vertical direction; and a connection member connecting at least a portion of the plurality of vibration generating portions to the vibration member, wherein the connection member comprises a first connection member, and at least two additional connection members spaced apart from the first connection member, wherein the at least two additional connection members comprise a second connection member and a third connection member, and wherein the second connection member and the third connection member are symmetrical to each other with the first connection member therebetween.

2. The apparatus of claim 1, wherein each of the plurality of vibration generating portions comprises:

a vibration layer including a piezoelectric material;

a first electrode layer at a first surface of the vibration layer; and a second electrode layer at a surface different from the first surface of the vibration layer.

3. The apparatus of claim 1, wherein the plurality of vibration generating portions are configured to vibrate in the same direction.

4. The apparatus of claim 2, wherein the connection member is connected to the first electrode layer of a first vibration generating portion of the plurality of vibration generating portions.

5. The apparatus of claim 2, wherein the connection member is disposed between the first electrode layer of a first vibration generating portion of the plurality of vibration generating portions and the vibration member.

6. The apparatus of claim 1, wherein each of the plurality of vibration generating portions has a rectangular shape.

7. The apparatus of claim 1, wherein a first vibration generating portion of the plurality of vibration generating portions directly connects to the vibration member by an adhesive layer.

8. The apparatus of claim 1, further comprising a protection member between two adjacent vibration generating portions of the plurality of vibration generating portions.

9. The apparatus of claim 1, wherein the plurality of vibration generating portions are configured to vibrate in different or opposite directions.

10. The apparatus of claim 9, wherein the connection member overlaps a portion of a first vibration generating portion of the plurality of vibration generating portions.

11. The apparatus of claim 9, further comprising a middle member between two adjacent vibration generating portions of the plurality of vibration generating portions.

12. The apparatus of claim 11, wherein the middle member is stiffer than the plurality of vibration generating portions.

13. The apparatus of claim 11, wherein the plurality of vibration generating portions are configured to vibrate in different or opposite directions with the middle member therebetween.

14. The apparatus of claim 9, wherein the plurality of vibration generating portion are spaced apart from the vibration member with the connection member therebetween.

15. The apparatus of claim 1, wherein the at least two additional connection members are spaced apart from an edge of the plurality of vibration generating portions such that an air gap is defined between the additional connection members, the plurality of vibration generating portions, and the vibration member.

16. The apparatus of claim 1, wherein the at least two additional connection members are spaced apart from the first connection member defining such that an air gap is defined between the additional connection members, the first connection member, the plurality of vibration portions, and the vibration member.

17. The apparatus of claim 1, wherein the at least two additional connection members are spaced apart from each other such that an air gap is defined between adjacent additional connection members, the plurality of vibration generating portions, and the vibration member.

18. The apparatus of claim 1, wherein the first connection member is stiffer than the at least two additional connection members.

19. The apparatus of claim 1, wherein the at least two additional connection members are more elastic than the first connection member.

20. The apparatus of claim 1, wherein a second connection member of the at least two additional connection member at one side of the first connection member is disposed between the first connection member and an end of the plurality of vibration generating portions.

21. The apparatus of claim 1, wherein a second connection member of the at least two additional connection members at one side of the first connection member is disposed adjacent to the first connection member.

22. The apparatus of claim 1, wherein a second connection member of the at least two additional connection member at one side of the first connection member is disposed adjacent to one side of the plurality of vibration generating portions.

23. The apparatus of claim 1, wherein the vibration member comprises one or more of metal, plastic, paper, fiber, cloth, wood, rubber, leather, glass, and mirror.

24. The apparatus of claim 1, wherein the vibration member comprises one or more of a display panel including a plurality of pixels configured to display an image, a screen panel on which an image is to be projected from a display apparatus, a light emitting diode lighting panel, an organic light emitting lighting panel, an inorganic light emitting lighting panel, a signage panel, an interior material of a vehicular means, an exterior material of a vehicular means, a glass window of a vehicular means, a seat interior material of a vehicular means, a ceiling material of a building, an interior material of a building, a glass window of a building, an interior material of an aircraft, a glass window of an aircraft, and a mirror.

25. An apparatus, comprising:

a vibration member;

a plurality of vibration generating portions configured to vibrate the vibration member in a vertical direction, the plurality of vibration generating portions overlapping one another in the vertical direction, each of the plurality of vibration generating portions including a vibration portion; and a connection member connecting at least a portion of the vibration portion to the vibration member, wherein the vibration portion includes a vibration layer, and the vibration layer includes a plurality of first portions and a plurality of second portions including material different from the plurality of first portions, and wherein each of the plurality of first portions includes an inorganic material having a piezoelectric effect, and each of the plurality of second portions includes an organic material having a greater flexibility as compared to the inorganic material.

26. The apparatus of claim 25, wherein the plurality of first portions and the plurality of second portions are alternately and repeatedly arranged in a first direction.

27. The apparatus of claim 26, wherein:

the width in the first direction of each of the plurality of first portions decreases or increases progressively in a direction from the center portion of the vibration layer to both edge portions of the vibration layer; and/or the width in the first direction of each of the plurality of second portions decreases progressively in a direction from a center portion of the vibration layer to both edge portions of the vibration layer.

28. The apparatus of claim 25, wherein the plurality of first portions are spaced apart from one another in a first direction and a second direction intersecting with the first direction, and the plurality of second portions are disposed between the plurality of first portions.

29. The apparatus of claim 25, wherein the plurality of first portions are spaced apart from one another in a first direction and a second direction intersecting with the first direction, and the plurality of second portions surround each of the plurality of first portions.

30. The apparatus of claim 29, wherein each of the plurality of first portions has a circular shape, an oval shape, a polygonal shape, or a donut shape.

31. The apparatus of claim 29, wherein each of the plurality of first portions has a triangular shape, and 2N adjacent first portions of the plurality of first portions having a triangular shape are arranged adjacent to one another to form a 2N-angular shape, where Nis a natural number of 2 or more.

32. An apparatus, comprising:

a vibration member;

a plurality of vibration generating portions overlapping one another; and a connection member connecting at least a portion of the plurality of vibration generating portions to the vibration member, wherein the connection member comprises a first connection member, and at least two additional connection members spaced apart from the first connection member, and wherein the first connection member is stiffer than the at least two additional connection members.

* * * * *